US008188917B2

(12) United States Patent
Gronemeyer et al.

(10) Patent No.: US 8,188,917 B2
(45) Date of Patent: May 29, 2012

(54) SYSTEM AND METHOD FOR OPERATING A GPS DEVICE IN A MICRO POWER MODE

(75) Inventors: Steven A. Gronemeyer, Cedar Rapids, IA (US); Sanjai Kohli, Manhattan Beach, CA (US); Mark A. Sturza, Encino, CA (US); Donald K. Leimer, Rancho Palos Verdes, CA (US)

(73) Assignee: CSR Technology Holdings Inc., Sunnyvale, CA (US)

( * ) Notice: Subject to any disclaimer, the term of this patent is extended or adjusted under 35 U.S.C. 154(b) by 188 days.

(21) Appl. No.: 12/414,612

(22) Filed: Mar. 30, 2009

(65) Prior Publication Data
US 2010/0039316 A1 Feb. 18, 2010

Related U.S. Application Data

(63) Continuation-in-part of application No. 12/347,857, filed on Dec. 31, 2008, now abandoned.

(60) Provisional application No. 61/031,321, filed on Feb. 25, 2008.

(51) Int. Cl.
G01S 19/34 (2010.01)
G01S 19/24 (2010.01)
G01S 19/23 (2010.01)
(52) U.S. Cl. .......... 342/357.74; 342/357.62; 342/357.63
(58) Field of Classification Search ............. 342/357.74, 342/357.66, 357.62, 357.63
See application file for complete search history.

(56) References Cited

U.S. PATENT DOCUMENTS

| | | | |
|---|---|---|---|
| 5,874,914 A | 2/1999 | Krasner | |
| 6,133,871 A | 10/2000 | Krasner | |
| 6,320,536 B1 * | 11/2001 | Sasaki | 342/357.62 |
| 6,662,107 B2 * | 12/2003 | Gronemeyer | 701/213 |
| 6,788,655 B1 | 9/2004 | Underbrink | |
| 6,882,308 B2 | 4/2005 | Farine et al. | |
| 7,148,844 B2 * | 12/2006 | Salkhi | 342/357.62 |
| 7,245,656 B2 | 7/2007 | Kalhan | |
| 7,459,984 B2 * | 12/2008 | Wang et al. | 331/176 |
| 7,460,064 B1 * | 12/2008 | Tester et al. | 342/357.51 |
| 7,471,238 B2 * | 12/2008 | Lillo et al. | 342/357.59 |
| 7,688,261 B2 * | 3/2010 | DiEsposti | 342/357.64 |
| 2003/0081657 A1 | 5/2003 | Ranta | |
| 2004/0041728 A1 | 3/2004 | Bromley et al. | |
| 2004/0117114 A1 * | 6/2004 | Diggelen | 701/213 |
| 2004/0252053 A1 | 12/2004 | Harvey | |
| 2005/0083230 A1 | 4/2005 | Harvey et al. | |
| 2006/0055597 A1 | 3/2006 | Kato et al. | |
| 2007/0183486 A1 | 8/2007 | Cheng et al. | |
| 2007/0276583 A1 | 11/2007 | Dobeck et al. | |
| 2009/0058719 A1 * | 3/2009 | Huang et al. | 342/357.1 |
| 2009/0098880 A1 * | 4/2009 | Lindquist | 455/456.1 |

OTHER PUBLICATIONS

International Search Report issued May 26, 2010 in corresponding PCT/US10/029059.

(Continued)

*Primary Examiner* — Thomas Tarcza
*Assistant Examiner* — Cassie Galt
(74) *Attorney, Agent, or Firm* — Pillsbury Winthrop Shaw Pittman LLP

(57) ABSTRACT

A wireless device including a transceiver that utilizes a power supply is described. The wireless device includes a Global Positioning System ("GPS") section having a plurality of GPS subsystems and a power controller in signal communication with the power supply and GPS section, wherein the power controller is configured to selectively power each GPS subsystem from the plurality of GPS subsystems.

50 Claims, 13 Drawing Sheets

OTHER PUBLICATIONS

International Search Report issued Nov. 2, 2009 in corresponding PCT/US09/034751.

International Search Report dated May 26, 2010.

* cited by examiner

SYSTEM AND METHOD FOR OPERATING A GPS DEVICE IN A MICRO POWER MODE

CROSS-REFERENCE TO RELATED APPLICATIONS

This application a continuation-in-part ("CIP") of U.S. Non-provisional patent application Ser. No. 12/347,857, titled "Always On GPS Device," filed on Dec. 31, 2008, which claims priority under 35 U.S.C §119(e) to U.S. Provisional Application Ser. No. 61/031,321, titled "Always On GPS Device," filed on Feb. 25, 2008, which are both incorporated into this application by reference in their entirety.

BACKGROUND OF THE INVENTION

1. Field of Invention

This invention relates in general to satellite navigation systems and, in particular, to wireless communication devices utilizing a Global Positioning System ("GPS") receiver.

2. Related Art

The use of telecommunication devices in present day society has grown at an enormous rate. Currently, the demand for portable telecommunication devices such as cellular telephones, Wi-Fi® and Bluetooth*) enabled portable devices, Personal Communication Service ("PCS") devices, Global Positioning System ("GPS") enabled portable devices, etc., is growing in popularity every day. As the demand increases for portable telecommunication devices with varying communication characteristics, manufactures are seeing a need to combine and integrate many of these devices. As an example, there is a need to integrate cellular telephones (i.e., "cellphones") with GPS receivers in order to allow a cellphone to determine its position for both personal and emergency use.

In FIG. 1, a block diagram of an example of a known implementation of a wireless device 100, such as a cellphone, communicating with a communication network 102 and GPS satellites 104, is shown. The wireless device 100 may be, for example, a cellphone and it may include a wireless transceiver 106, a GPS section 108 (where the GPS section 108 may be a GPS receiver or GPS tracker), and battery 110. In operation, the wireless transceiver 106 may be in signal communication with communication network 102 via wireless signal path 112 and basestation 114 and the GPS receiver 108 may be in signal communication with the GPS satellites 104 via wireless signal path 116.

The need for integrating cellphones with GPS receivers is a result of the U.S. Congress though the FCC mandating that cellular service providers report the position of a cellular handset that has dialed 911 to an emergency call center. The required accuracy is 100 meters for 67 percent of emergency calls, 300 meters for 95 percent of emergency calls for network-based solutions, and 50 meters for 67 percent of calls and 150 meters for 95 percent of calls for handset-based solutions. To comply with this mandate, many service providers require that handsets used on their system contain embedded GPS receivers. The FCC has extended the requirement for "E911" position reporting to VoIP service providers and to satellite telephone service provides. Handset standby time is very important to consumers, and hence to service providers.

Unfortunately, location based services require near instant position fixes that require significant power; however, these fixes can be refined over the next several seconds for improved accuracy. In general, embedded GPS receivers can provide near instant position fixes provided they have minimal time, frequency, and to some extent, position uncertainties predetermined. Unfortunately, at present, GPS receivers do no have the ability to operate continuously without draining the power source (such as a battery).

Known approaches to this problem have included utilizing power cycling modes that have stronger signal requirements for the same or greater energy expenditure of the battery. These approaches include making fixed (i.e., blind) uncertainty assumptions about the real-time clock ("RTC") when using the RTC to store time. Unfortunately, these cycling mode approaches do not use stationary assumptions and/or indoor assumptions to determine how measurements made within the cycle are used or interpreted; instead, these approaches generally return the GPS receiver to full power operation. These approaches do not take advantage of the Temperature Controlled Crystal Oscillator ("TCXO") stability in the absence of GPS measurements. Additionally, these approaches do not infer temperature or temperature rate from relative RTC and TXCO frequency and they do not operate against an energy constraint because they only operate against an update rate.

Aiding information can be provided over communications networks, but this requires the ability to receive aiding over a communication network. Thus, it is desirable for an embedded GPS receiver to maintain accurate estimates of time, frequency, and position. These accurate estimates would allow the embedded GPS receiver to acquire signals at lower levels.

Therefore, there is a need for system and method capable of minimizing the power source drain of the embedded GPS receiver when fixing the position of a wireless device.

SUMMARY

A wireless device including a transceiver that utilizes a power supply is described. The wireless device includes a Global Positioning System ("GPS") section having a plurality of GPS subsystems and a power controller in signal communication with the power supply and the GPS section, wherein the power controller is configured to selectively power each GPS subsystem from the plurality of GPS subsystems.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of examples of implementations, reference is made to the accompanying drawings that form a part hereof, and which show, by way of illustration, specific implementations of the invention that may be utilized. Other implementations may be utilized and structural changes may be made without departing from the scope of the present invention.

Described herein is a system and a method for minimizing the drain of a power supply within a wireless device that has a Global Positioning System ("GPS") section that utilizes a Micro-Power Mode ("MPM"). The wireless device may include a GPS section having a plurality of GPS subsystems and a power controller in signal communication with the power supply and the GPS section. The power controller is configured to selectively power up or down each GPS subsystem from the plurality of GPS subsystems.

The invention reduces the energy per fix, improves the Time-To-First-Fix ("TTFF"), and reduces or eliminates the need for data aiding to provide continuous positioning with high probability at low power in weak signal or indoor environments. The invention accomplishes these goals by managing the time and frequency uncertainties to minimize the need for bit and/or frame synchronization (i.e., "bit sync" or "frame sync").

Architecture of a System with a GPS Section Utilizing MPM

Figure 1:
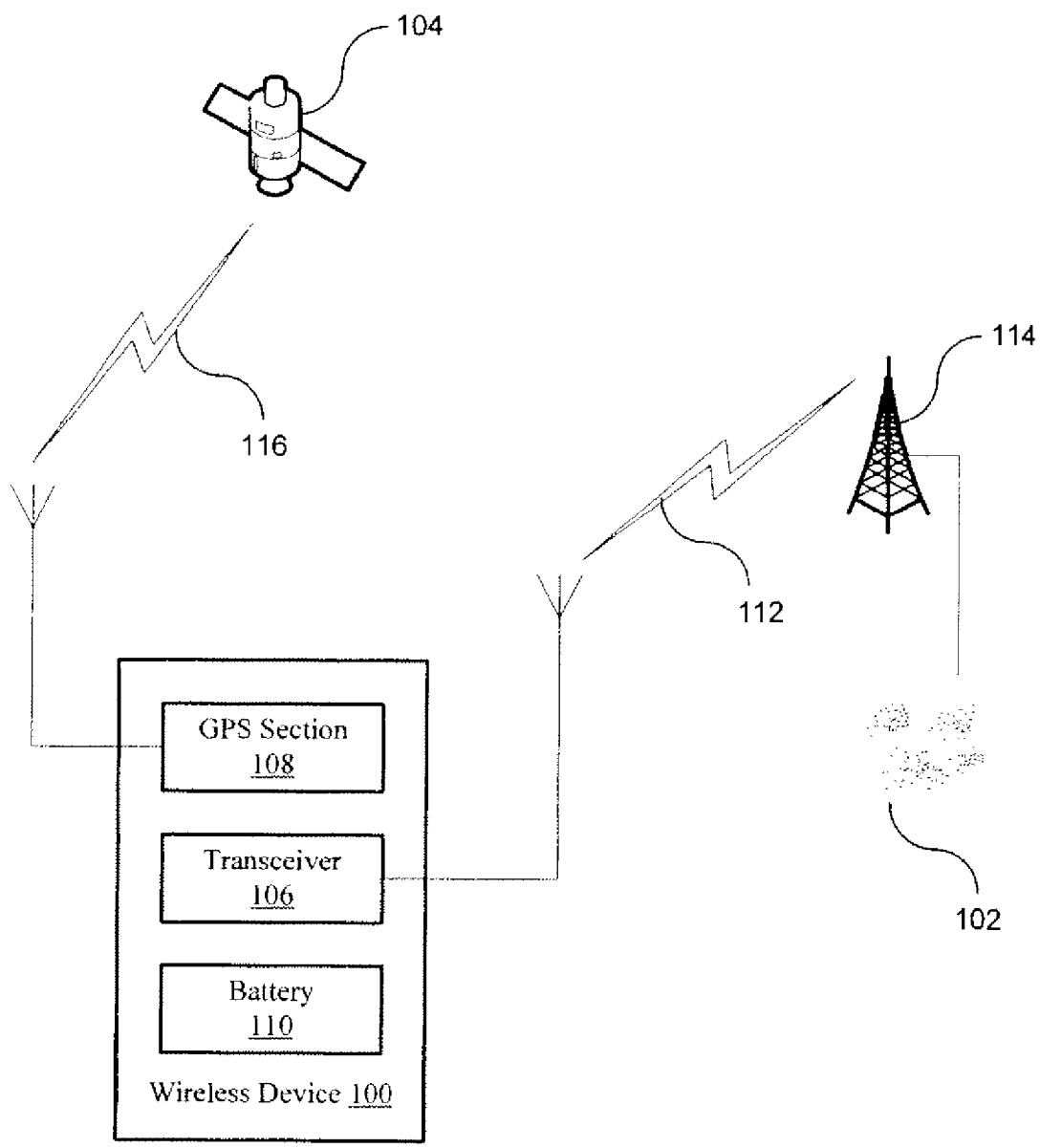
FIG. 1 shows a block diagram of an example of a known implementation of a wireless device communicating with a wireless network and a plurality of Global Positioning System ("GPS") satellites.
Figure 2:
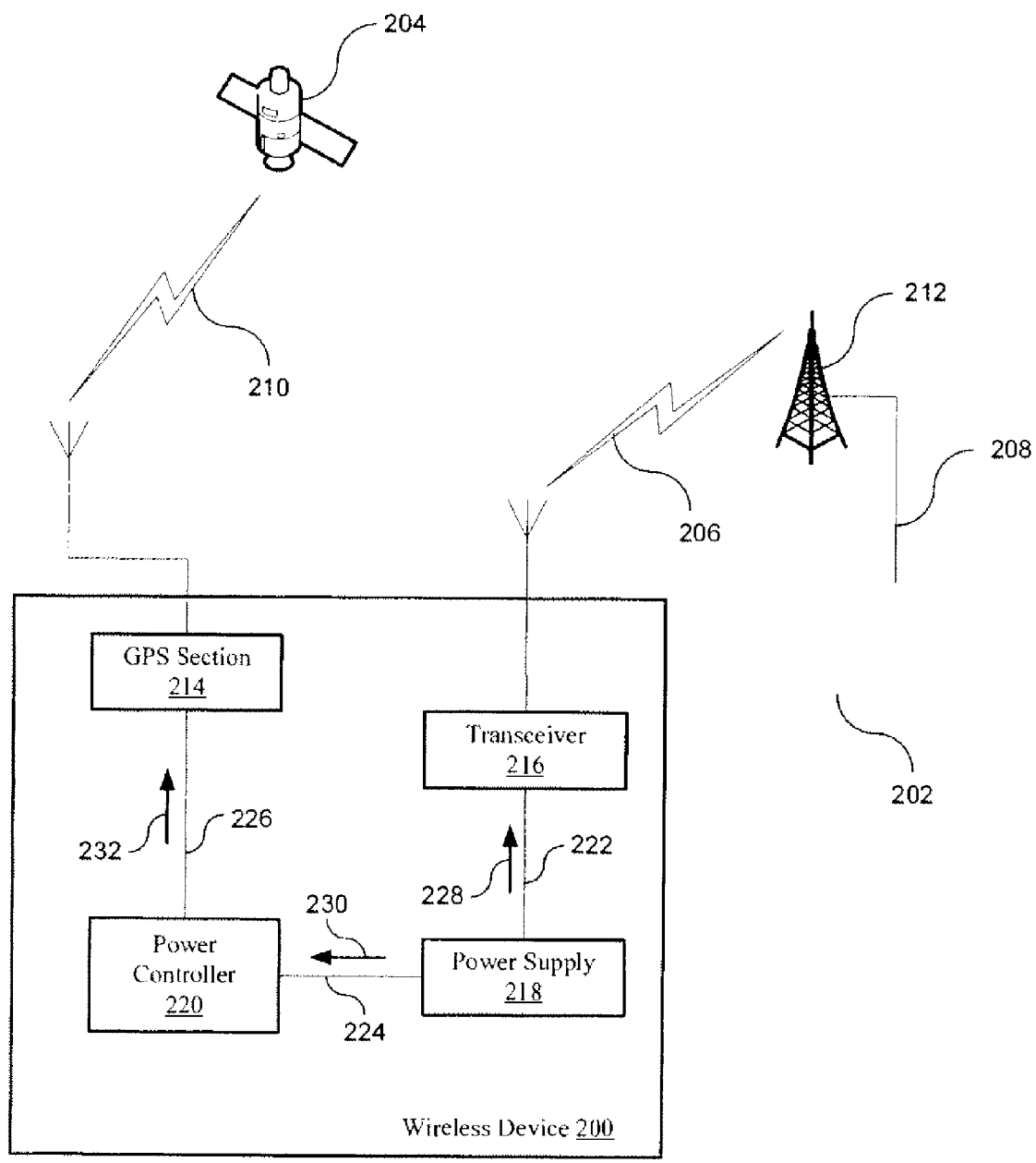
FIG. 2 shows a block diagram of an example of an implementation of a wireless device in accordance with the invention.

As an example, in FIG. 2, a block diagram of an example of an implementation of a wireless device 200 is shown in signal communication with a communications network 202 and GPS satellites 204 via signal paths 206, 208 and 210, respectively, where signal paths 206 and 208 pass through basestation 212. The wireless device 200 may include a GPS section 214, transceiver 216, power supply 218, and a power controller 220. The power supply 218 may be in signal communication with the transceiver 216 and power controller 220 via signal paths 222 and 224, respectively. The power controller 220 also may be in signal communication with the GPS section 214 via signal path 226. The power supply 218 may be a battery.

In this example, the wireless device 200 utilizes MPM. The GPS section 214 is embedded in the wireless device 200 to allow determination of the location of the wireless device 200. This location information may be provided to the user (not shown) of the wireless device 200, an operator (not shown) of the communications network 202, or to a third party (not shown) through the communications network 202 via the transceiver 216. The GPS section 214 may be optionally a GPS receiver or GPS tracker.

If the GPS section 214 is a GPS tracker, the GPS section 214 would be capable of receiving GPS signals from the GPS satellites 204 (via signal path 210) and producing corresponding pseudo-range information from each received GPS signal that would correspond to a respective GPS satellite within the plurality of GPS signals 204. The pseudo-range information would then be passed to another section external to the GPS section 214, which would receive the pseudo-range information and then calculate the location of the wireless device 200. This external section could be located within the wireless device 200 but external to the GPS section 200 such as, for example, a digital signal processor ("DSP") microcontroller, and/or microprocessor. Alternatively, this external section could be located external to the wireless device 200 such as, for example, a GPS server (not shown) in signal communication with the communication network 202.

If the GPS section 214 is a GPS receiver, the GPS section 214 again would be capable of receiving GPS signals from the GPS satellites 204 (via signal path 210) and produce corresponding pseudo-range information from each received GPS signal that would correspond to a respective GPS satellite within the plurality of GPS signals 204. However, unlike the case of a GPS tracker, in this case the GPS section 214 would be able to calculate the location of the wireless device 200 from the pseudo-range information within the GPS section 214.

In this example, the power supply provides a transceiver power signal 228, via signal path 222, to the transceiver 216 and a GPS power signal 230, via signal path 224, to the power controller 220. It is appreciated by those skilled in the art that the transceiver and GPS power signals 228 and 230 may be supply currents produced by the power supply 218. The power controller 220 is a module, circuit, and/or component of the wireless device 200 that receives the GPS power signal 230 and is capable of controlling the amount of power that is provided from the power supply 218 to the GPS section 214 via a controlled power signal 232, which may be a supply current. Specifically, the GPS section 214 may include a plurality of GPS subsystems (not shown) that are each in signal communication with the power controller 220 via signal path 226, which may include individual signal paths within the signal path 226 (not shown).

The power controller 220 is capable of controlling the amount of power (via power signal 232) that is provided from the power supply 218 to each individual GPS subsystem. The power controller 220 is also capable of receiving a power control input (not shown) from the wireless device 200 that determines how the power controller 220 controls the amount of power provided from the power supply 218 to each individual GPS subsystem. As an example, the power controller 220 may have a plurality of outputs (not shown) in signal communication with each of the individual GPS subsystems. In operation, the power controller 220 is capable of receiving the GPS power signal 230 and receiving an input power control signal (not shown). In response, the power controller 220 selects an output from the plurality of outputs and sends an output power signal from the selected output to a specific GPS subsystem from the plurality of GPS subsystems. In this example, it is appreciated by those skilled in the art that the power controller 220 may also be part of, or partially embedded in, the GPS section 214. Specifically, the GPS section 214 may include several power domains (i.e., several digital, several RF, several mixed signal, and several non-volatile mixed signal) that control circuits (not shown) within the GPS section 214 that turn on and off GPS subsystems under real-time control of either a software (such as, for example, when a processor GPS subsystem is running) or hardware state machine (when the processor GPS subsystem is not running). In either case, the controller 220 is responsible for controlling base power supplies as they are applied to the GPS subsystems. Typically, these base power supplies are either on all of the time, as in a non-volatile supply, or on most of the time unless the system is turned off completely.

In these examples, it is appreciated by those skilled in the art that GPS satellites 204 represent at least one of a plurality of GPS satellites from the GPS constellation. Generally, the GPS section 214 receives GPS signals from at least three GPS satellites in order to determine a two-dimensional location of the wireless device 200. In order to determine a three-dimensional location of the wireless device 200, the GPS section 214 would need to receive at least four GPS signals. It is also appreciated that the while FIG. 2 only shows one signal path 210 from GPS satellites 204 to the GPS section 214, the signal path 210 may include a plurality of signal paths (not shown) from each individual GPS satellite within the plurality of GPS signals 204 to the GPS section 214.

It is also appreciated that the circuits, components, modules, and/or devices of the wireless device 200 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Figure 3:
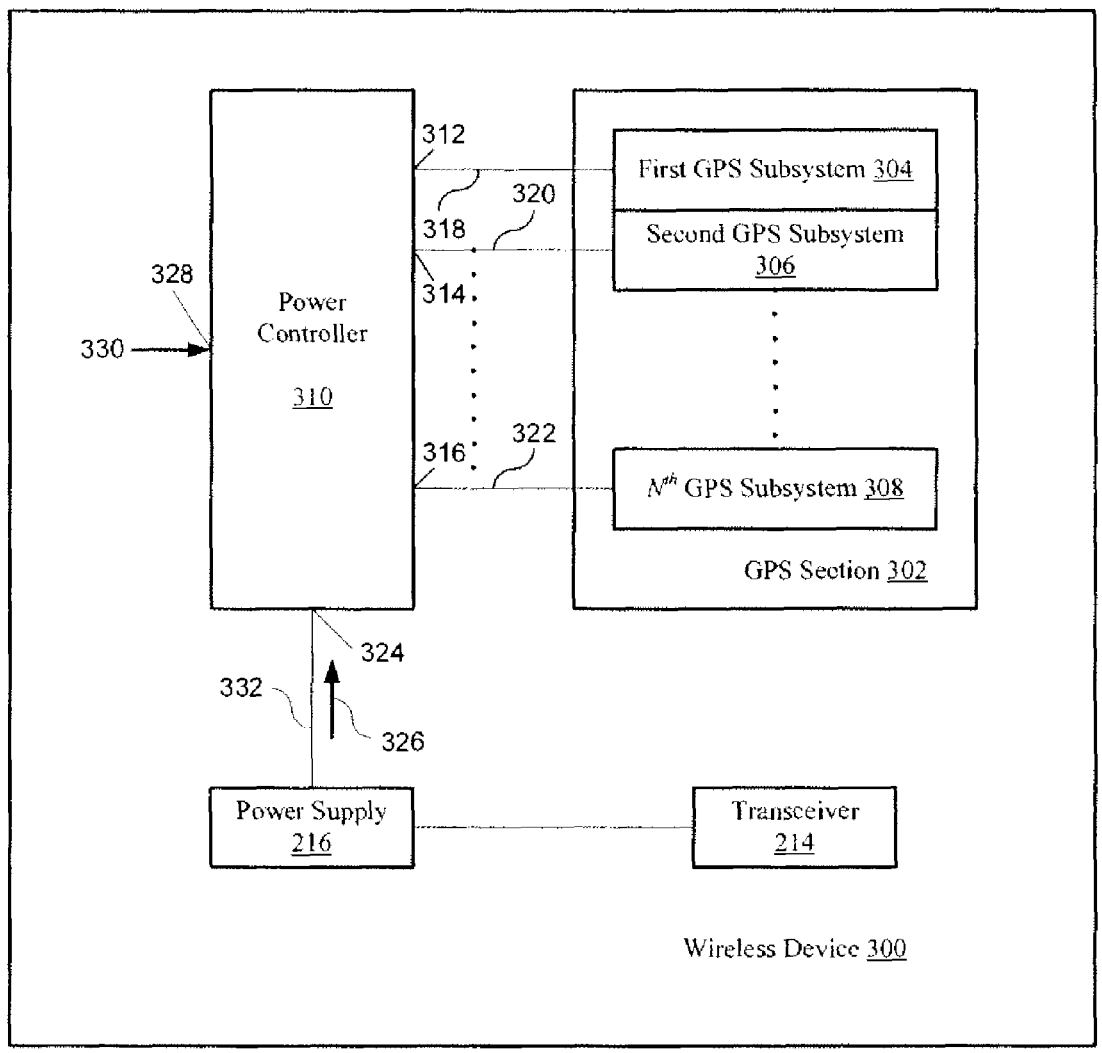
FIG. 3 shows a block diagram of an example of an implementation of a wireless device utilizing the power controller and GPS section shown in FIG. 2 in accordance with the invention.

As an example, in FIG. 3, another block diagram of the wireless device 300 is shown where the GPS Section 302 is shown to include a plurality of GPS subsystems ranging from a first GPS subsystem 304, a second GPS subsystem 306, to a $N^{th}$ GPS subsystem 308. In this example, the power controller 310 is shown to have a plurality of outputs 312, 314, and 316 that are in signal communication with the plurality of GPS subsystems via signal paths 318, 320, and 322, respectively. The power controller 310 also has a first input 324 (for receiving a GPS power signal 326) and second input 328 (for receiving an input power control signal 330) and is in signal communication with the power supply 216 via signal path 332. As an example, the plurality of GPS subsystems 304, 306, and 308 may include radio frequency ("RF") and intermediate frequency ("IF") front-end circuitry, baseband circuitry, and a controller/processor subsystem.

In operation, the power controller 310 is capable of receiving both the GPS power signal 326 and the input power control signal 330 and, in response, selecting an output from the plurality of outputs 312, 314, and 316 and sending at least one power signal (not shown) from the power controller 310 through the selected output from the plurality of outputs 312, 314, and 316 to the corresponding GPS subsystem of the plurality of GPS subsystems 304, 306, and 308. In this example, the power signal (not shown) may be related to the input power control signal 330.

Figure 4:
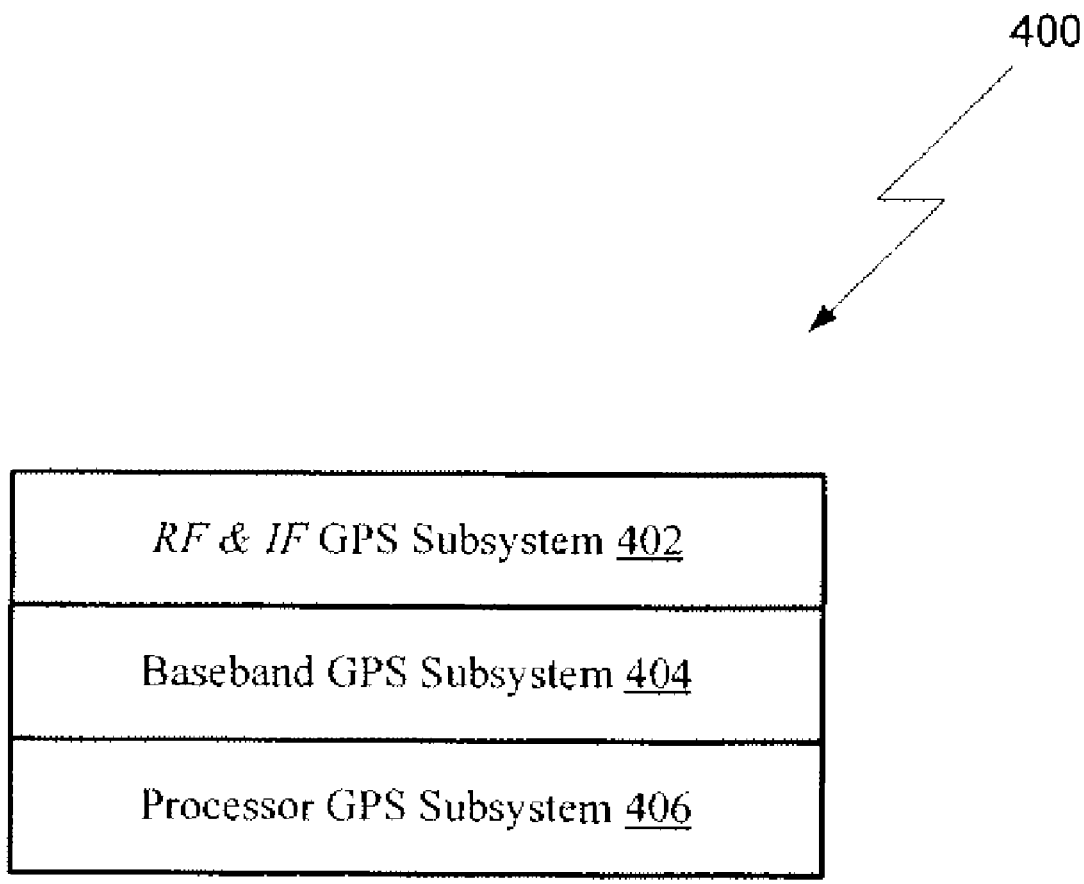
FIG. 4 shows a block diagram of an example of an implementation of the GPS section shown in FIGS. 2 and 3 in accordance with the invention.

In FIG. 4, a block diagram of an example of an implementation of the GPS section 400 is shown. In this example, the GPS section 400 may include a plurality of GPS subsystems that may include a RF and IF GPS subsystem 402, baseband GPS subsystem 404, and processor GPS subsystem 406.

Figure 5:
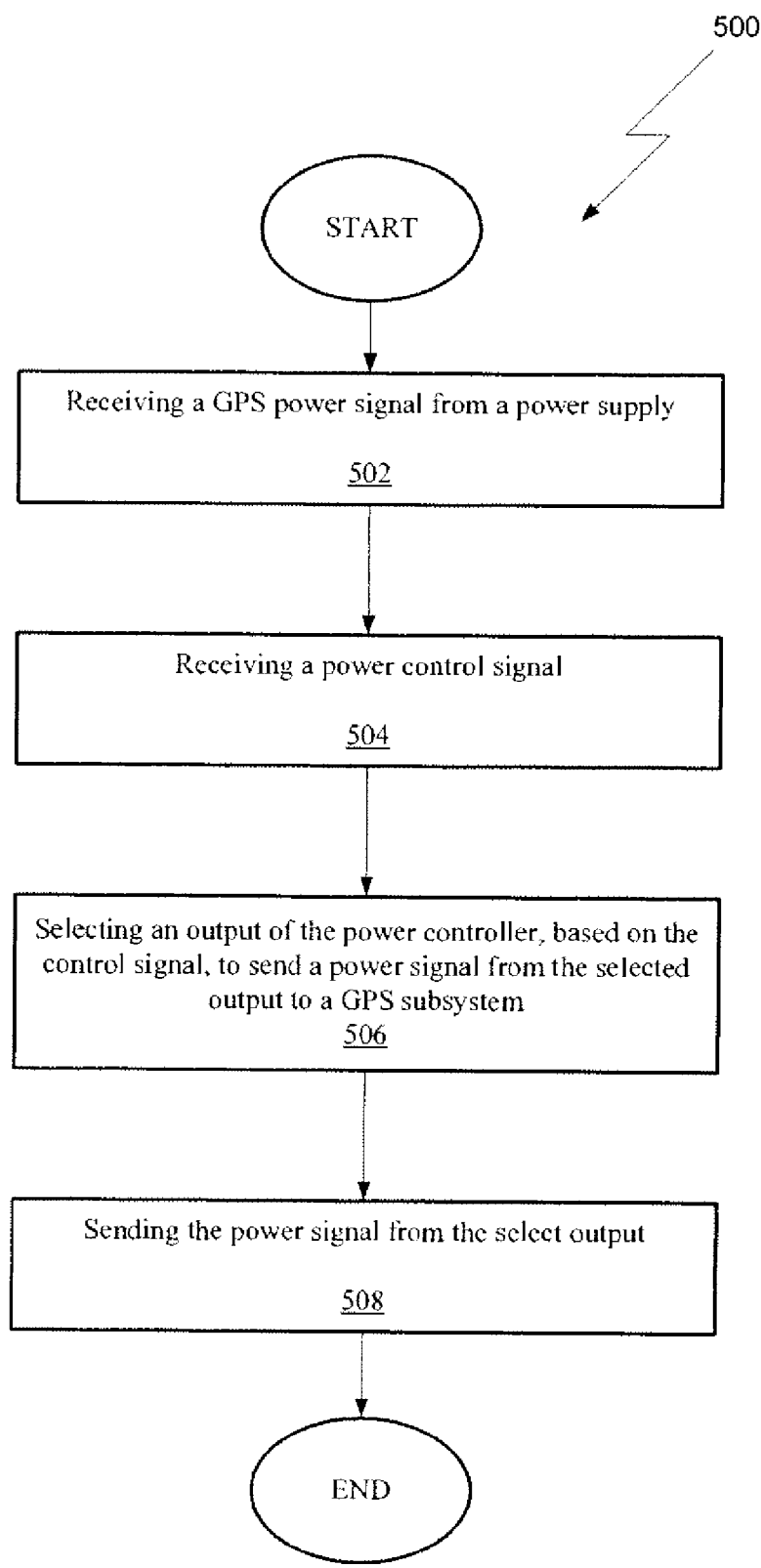
FIG. 5 shows a flowchart of an example of an implementation of a method preformed by the power controller, shown in FIG. 3, in operation in accordance with the invention.

FIG. 5 shows a flowchart 500 of an example of an implementation of method performed by the power controller 310, FIG. 3, in operation as was described above. The process starts in step 502 where the power controller 310 receives GPS power signal 326 from the power supply 216. The power controller 310 then receives the input power control signal 330 in step 504 and, in step 506, the power controller 310 selects at least one output of the power controller 310 to send at least one power signal to at least one corresponding GPS subsystem of the GPS section 302 based on the input power control signal 330. The power controller 310 then, in step 508, sends the power signal from the selected output to the corresponding GPS subsystem.

Figure 6:
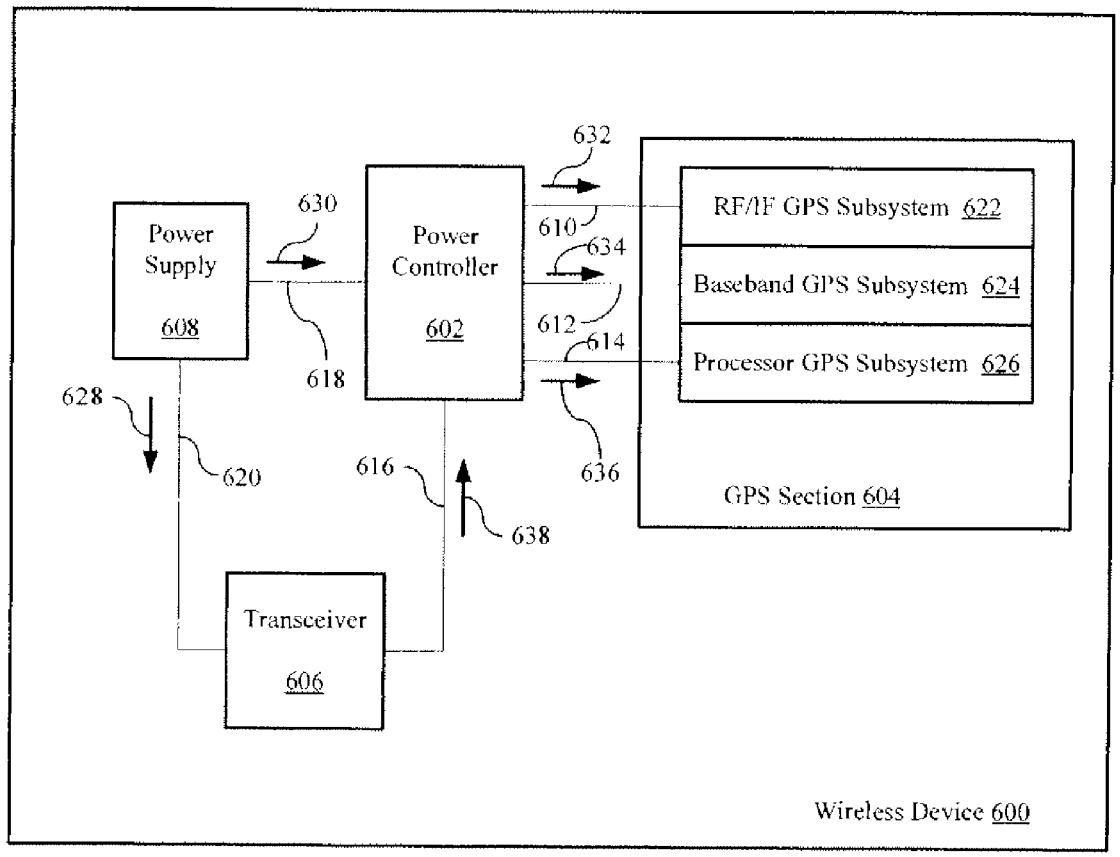
FIG. 6 shows a block diagram of an example of an implementation of a wireless device utilizing a power controller to selectively power a GPS section in accordance with the invention.

Turning to FIG. 6, a block diagram of an example of an implementation of a wireless device 600 utilizing a power controller 602 to selectively power a GPS section 604 is shown. The wireless device 600 may include the power controller 602, GPS section 604, a transceiver 606, and a power supply 608. In this example, the power controller 602 may be in signal communication with GPS section 604, transceiver 606, and power supply 608 via signal paths 610, 612, 614, 616, and 618, respectively. The transceiver 606 may be in signal communication with the power supply 608 via signal path 620. The GPS section 604 may include a plurality of GPS subsystems that are a combined RF/IF GPS subsystem 622, a baseband GPS subsystem 624, and a processor GPS subsystem 626 that are in signal communication with the power controller 602 via signal paths 610, 612, and 614, respectively.

In this example, the wireless device 600 may be a cellular wireless device where the transceiver 606 is a cellular transceiver. The wireless device 600 is configured such that each of the GPS section 604 subsystems (i.e., RF/IF 622, baseband 624, and processor 626) may be independently powered by the power controller 602.

In operation, the power supply 608 supplies a transceiver power signal 628 to the transceiver 606 and a GPS power signal 630 to the power controller 602 via signal paths 620 and 618, respectively. The power controller 602 selectively powers each of the GPS subsystems (via output power signals 632, 634, and 636) to perform GPS sampling and measurement based on a received input power control signal 638 from the transceiver 606 (via signal path 616) where the received input power control signal 638 includes information of the history of cellular Receive Signal Strength Indicator ("RSSI") measurements made by the transceiver 606.

Micro Power Mode ("MPM")

Turning back to FIG. 6, the wireless device 600 may operate in multiple power states, where each power state is a hardware condition that may be employed by multiple major modes of operation. The major modes of operation are modes that may be commanded by an external interface (not shown). The major modes of operation may include: a continuous mode that provides the highest quality, lowest position uncertainty at all times because the software (not shown) in the GPS section 604 is allowed to invoke all operating modes and mitigation methods; a trickle-power mode that provides minimizing average power consumption subject to a solution update rate, where the software in the GPS section 604 may operate the GPS section 604 at higher duty cycles including the continuous mode; the MPM that attempts to minimize position, time, and frequency uncertainty on a best-effort basis subject to an average power consumption constraint; and an adaptive mode that attempts to minimize average power consumption subject to a defined position uncertainty constraint.

Generally, the power states may have multiple sub-states based on control register settings (not shown) in the GPS section 604 that are imposed by the individual operating modes. Generally, the multiple power states may include: a full power state where all the circuits in the GPS section 604 have power applied; a clock only state that is similar to the full power state subject to internal variation where the RF sections (such as, for example, RF/IF GPS subsystem 622) of the GPS section 604 are largely unbiased while the baseband sections (such as, for example, baseband GPS subsystem 624) continue to be power up; a standby state where only the processor and processor memory (both not shown, but both may be located within processor GPS subsystem 626) is maintained in a retention mode, the main digital core (not shown but may be located within processor GPS subsystem 626) of the GPS section 604 has voltage removed, the RF sections 622 have all bias removed, a temperature-controlled crystal oscillator ("TCXO") (not shown) is not powered up, and the non-volatile domain is operating; a hibernate state where only the non-volatile Keep-alive ("KA") domain is operating; and an off-state where all the power to the GPS section 604 is removed.

The KA domain is all the non-volatile circuits. Generally as a minimum, this is the power control state machine that will bring the system back up when one of the stimulus signals occurs (such as, for example, an RTC alarm, external wake interrupt, temperature recorder temperature change alarm, inertial instrument motion alarm, etc.). This minimum circuitry generally includes the RTC clock input or oscillator (so that the control state machine can operate), the RTC clock counter and alarm, and some non-volatile memory. It may also include an autonomously operating temperature recorder, all CMOS (digital) IO and its control and the internal power management blocks such as, for example, regulators and their state controls from the power control state machine.

Of these states, the standby state may be utilized by all the major modes that cycle power including the trickle power mode, adaptive mode, and MPM. However, the trickle power mode may also use hibernate state if the duty cycle of the trickle power is low enough such as, for example, the system operates 1% of the time and hibernates 99% of the time.

Underlying the major modes of operation are three main primitive modes of operation that include: an acquisition mode that is an operation where a satellite signal is acquired by searching for and synchronizing a local reference to a received GPS signal of a particular GPS satellite, which includes determining the carrier frequency, phase, code frequency, and phase and time alignment of the navigation data bits of the GPS signal; a tracking mode that includes tracking the carrier and code of the received GPS signals such that range and range rate measurements to the GPS satellites are made and down-link data is demodulated; and an impairment processing mode where clutter of interfering signals such as continuous wave ("CW") and cross-correlation interference is removed.

As stated above, in the MPM the wireless device 600 attempts to minimize position, time and frequency uncertainty on a best-effort basis, subject to an average power consumption constraint. MPM attempts to maintain internal aiding in difficult indoor environments. Generally, the MPM may be entered from the continuous, adaptive or trickle-power modes where the transition to the MPM may be actively commanded or done by default. If done by default, the wireless device 600 first establishes low uncertainty parameters utilizing the continuous mode.

Additionally, the continuous mode, trickle-power mode, and MPM may be a sub-mode of operation of the adaptive mode where the adaptive mode is always entered from the continuous mode. If the adaptive mode is selected as the default mode, the adaptive mode starts in continuous mode but the wireless device 600 is allowed to utilize sub-modes based on the continuous mode, trickle-power mode, or MPM in order to maintain a given uncertainty of a navigation solution while utilizing minimum average power. The wireless device 600 will transition among these sub-modes in response to its evaluation of conditions. Typically, transitions are in response to platform dynamics, blockage conditions, and signal strength. Generally, platform dynamics and blockage require more frequent updates, while higher signal strength allows for shorter operating periods to update the navigation solution. Assuming that the wireless device 600 does not have to take into account useless waste of power consumed, such as entering long periods of undetectable signals, the adaptive mode will utilize a strategy of periodically operating in MPM to detect a change in environment. In this case, when external information is available, such as cellphone RSSI, temperature, information from motion sensors or other inputs, the changes in conditions may be detected and the MPM utilized to detect a corresponding change in GPS signal conditions.

The MPM is a very low duty cycle mode based on snapshot buffer capture. Unlike trickle-power mode, the MPM does not require a navigation update at each "on" time. If the MPM detects a stationary environment, it is sufficient to update time and frequency on a best effort basis. However, if an adequate number of measurements are available, the navigation solution will be updated to further confirm the current position.

Generally, data collection in the MPM is rare. If server-based extended ephemeris ("EE") is available, the MPM does not need to perform data collection at all. If client based EE is implemented, the MPM performs data collection only when required to support that method and only when conditions (such as, for example, signal strengths, number of satellites providing needed data, etc.) are favorable. If neither EE method is implemented, data collection is carefully controlled such that ephemeris collection would generally not occur more than once or twice an hour.

Data collection, when performed, is on a word basis as in the trickle-power mode. This allows the data collection operation to be terminated if conditions suddenly change. Valid words are retained. The next update is timed so that if favorable conditions are detected, a transition to tracking and collection mode may be made quickly to exploit the favorable conditions detected. A method of biased almanac measurements may be utilized to allow the system to operate as a timing receiver to utilize measurements from the GPS satellites that are still without ephemeris.

In this example, the MPM does not require periodic output to a host where the host is processor that runs the overall platform of wireless device 600, such as the baseband processor (not shown) of wireless device 600, which may be a cellphone, PDA, or other communication platform. The host will wake up the GPS section (which is typically in the standby state) if it wishes to inquire about the current navigation solution or command a new mode of operation.

If the GPS section 604 is a GPS tracker, the host would be the processor external to the GPS section 604 that would run the navigation solution portion of the GPS software that accepts pseudo-range measurements from the GPS tracker and calculates a position solution. Typically, the host processor uses a very high speed clock and has very power consumptive, so the GPS section 604 should use it as seldom as possible when in low power modes. The host in the case of a GPS tracker may also provide information that the GPS tracker needs, such as, for example, an evaluation of the GPS satellite orbits to provide GPS satellite positions as a function of time. Generally, the GPS tracker uses this information to adjust the code phase search regions whenever the GPS tracker does acquisition in any mode. In MPM, the host provides a short term model that allows the GPS tracker to efficiently determine GPS satellite position versus time for some interval, such as 30 minutes. In this example, the GPS tracker does not need to wake the host for 30 minutes until it needs a new data "fix." This example reduces overall system power. In this example, if the host wants a full GPS fix, the host can wake the GPS tracker or full GPS engine at any time to request this.

Figure 7:
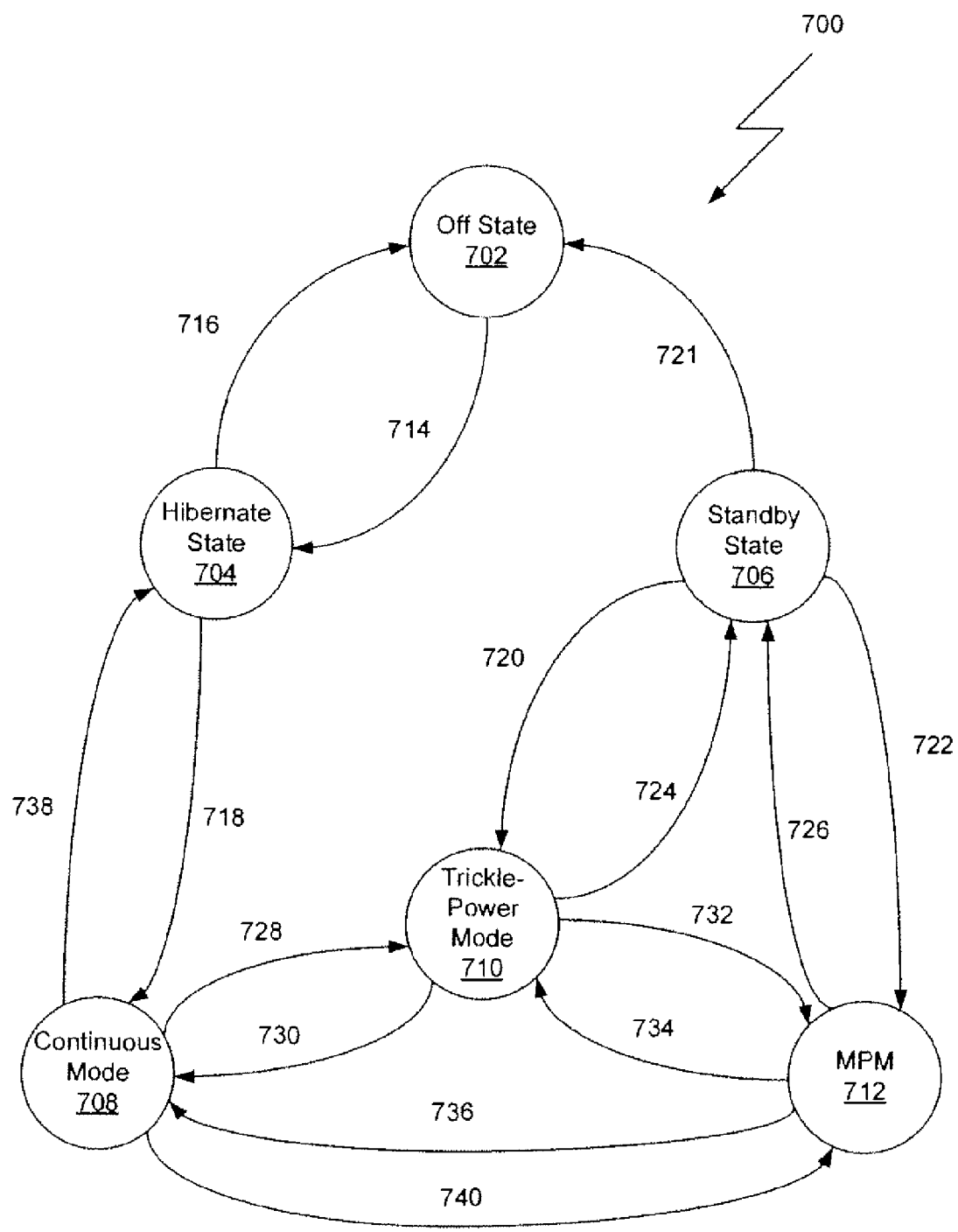
FIG. 7 shows a state diagram of an example of an implementation of the adaptive mode that illustrates the transitions between three different power states and three major modes of operation.

Turning to FIG. 7, a state diagram 700 of an example of an implementation of the adaptive mode is shown that illustrates the transitions between three different power states and three major modes of operation. The three power states are the off-state 702, hibernate state 704, and standby state 706. The three major modes of operation are the continuous mode 708, trickle-power mode 710, and MPM 712. In this example, the power states are shown in order to indicate which power states may interact with the different major modes. Additionally, in this example, the on-state is implicitly in force during any of the operation of any of the major modes.

In the off-state 702, all the power is removed from the GPS section 604 such that all navigation information is lost. When the power is restored, the system transitions 714 to the hibernate state 704 to await a hardware stimulus to turn on. In the hibernation state 704, the system is in an arbitrary duration condition. If the system is turned off, the system transitions 716 back to the off-state 702. However, when the system is turned on, it will enter 718 the default mode of the application, which in this example is the continuous mode 708 of operation.

Turning to the standby state 706, the system generally enters the standby state 706 when the adaptive mode, trickle-power mode 710, or MPM 712 is in its off cycle. The system may enter the trickle-power mode 710 or MPM 712 via events 720 and 722, respectively. Additionally, the trickle-power mode 710 and MPM 712 may cause the system to enter the standby state 706 via events 724 and 726, respectively. Normally, the system exits the standby state 706 to either the trickle-power mode 710 or MPM 712 in response to a real-time clock ("RTC") alarm signaling the start of an "on" cycle. If the system is turned off, the system transitions 721 to the off-state 702.

The continuous mode 708, operates continuously once the system is turned on. Once turned on, the system utilizes an initial acquisition type that depends on the navigation data and timekeeping of the KA, along with any host port data provided.

In this example, the KA circuits include the RTC clock and the navigation random access memory ("RAM"), ephemeris data, and other system state variable. The host port data may include any kind of aiding from the host processor, such as time and frequency aiding, ephemeris data, position estimates and the like. The host may have this data by virtue of being a member of a network and being in communication with network entities such as, for example, basestations or servers. The host data may also be provided by a user (e.g., user selects a city from a pull down list as an initial position) or it may be navigation data that the GPS section sent to the host before it last entered low power modes and the host has stored this information for the GPS section (e.g., in a flash or hard drive).

Transitions from continuous mode 708 to other modes or states are as follows. The system transitions 728 to the trickle-power mode 710 if the host port receives a command to enter trickle-power mode 710 and the system uncertainties are low enough to allow it, a transition to trickle-power mode 710 of operation is made. Since generally the host port is the main message IO between the GPS section and the platform main processor, the command from host could be due to a change in the platform state commanded by a human user interface or an automated transition by the host level software. The host may also command a mode change, or a wakeup during a given mode, due to a sensor connected to the host instead of the GPS section (i.e., motion sensor, transceiver RSSI value, etc.). If the sensor is primarily utilized by the GPS section, it may normally be attached to the GPS and any alarm associated with the sensor may wake the GPS section directly. Other sensors, such as the cellphone transceiver and its RSSI value, typically may be sent via the host processor to wake the GSP section or change its mode.

In trickle-power mode, the GPS section wakes up periodically to acquire GPS signals, make measurements and update the position solution. The type of search done assumes a certain limited range of code phase and frequency uncertainty that are appropriate to the acquisition method used by the mode. The GPS section should not transition if the uncertainty is larger than these limits, since trickle-power mode acquisition would likely fail in this case. There are also limits on past observed signal levels for trickle-power mode operation, since the acquisition types performed typically only search down to a certain signal level.

The uncertainties should be such that the acquisition types utilized in trickle-power mode 710 after leaving the standby state 706 are likely to succeed. If trickle-power mode 710 acquisition fails to provide the required update rate or if data collection is required, the system may transition 730 back to operate in continuous mode 708 operation. Once data collection completes and/or uncertainties are reduced, the system may return 728 to trickle-power mode 710 of operation. The system may also transition 724 to the standby state 706 when the trickle-power mode 710 enters a low power cycle where it updates the navigation storage and triggers a finite state machine ("FSM") to enter the standby state 706.

The system transitions 732 to the MPM 712, if the host port receives a command to enter the MPM 712. The MPM is a power constrained, best effort mode in which uncertainties are managed based on very low duty cycle sample capture. The MPM 712 will be more effective if the transition is commanded after successful navigation by the system when the uncertainties are low. However, the system may also be commanded under adverse conditions into the MPM 712 as a power constrained means of monitoring GPS conditions and reducing uncertainties in the system when possible. In this example, if the MPM 712 is entered with large uncertainty, the search types utilized by the system may be adjusted accordingly. If the host port commands the system to transition 734 from the MPM 712 to the trickle-power mode 710 and the uncertainties are low enough to support duty cycled operation, the system transitions 734 back to the trickle power-mode 710.

The system transitions 736 from the MPM 712 to the continuous mode 708 if the host commands the system to switch to the continuous mode 708. Additionally, the system will transition 736 if the host commanded a switch to the trickle-power mode 710 but the current uncertainties would not allow the trickle-power mode 710 acquisition process to succeed. Moreover, if the system requires data collection, the system will temporary transition 736 to continuous mode 708 and then the system transitions 740 back to the MPM 712 after the data collection is complete.

The system transitions 730 from the trickle-power mode 710 to the continuous mode 708 if the host commands the system to switch to the continuous mode 708 or if necessary to meet the minimum update rate requested for the trickle-power mode 710.

The system may also transition 738 from the continuous mode 708 to the hibernate state 704, if a host command to hibernate is received by the system. The system then stores any navigation data and triggers the FSM to shut down.

Returning to the MPM, the MPM is a power constrained, best effort mode of operation that minimizes solution uncertainty. The MPM operates at a very low duty cycle using a snapshot mode operation. Calibration procedures for the RTC and TCXO are incorporated in the MPM in order to control time and frequency uncertainty. If a temperature sensor is implemented in the system, a temperature compensation process would be a part of the calibration process.

Generally, the snapshot mode of operation includes two types of operations. First, direct acquisition is utilized to search for each GPS satellite. The resulting acquired GPS signals are utilized to produce interpolated measurements of code phase and frequency. If enough measurements are acquired, a full solution update is computed by the system. If at least one measurement is acquired, but not enough for a full update, the measurements are used to update the solution running the system as a timing receiver. If no direct acquisitions are successful, the peak buffers of all searches are utilized to perform a cross satellite search. This procedure yields at most one measurement that is used to update the solution running the system as a timing receiver.

The MPM utilizes acquisition strategies based on the use of past acquisition experience for weak signal, static indoor timing receiver conditions. As an example, searches would be conducted based on recent past successes. Those GPS satellites that have been recently acquired using the 100 ms mode would be searched first when the frequency or time uncertainty grows and does not allow all likely visible GPS satellites to be searched within the average power constraint. Relative observed GPS signal strength would also be applied in this ordering process.

Data would be kept regarding successful acquisition as a function of azimuth and elevation. The MPM utilizes any low loss paths to an indoor location that is occupied for an extended time. If success is observed in a given direction, a newly risen GPS satellite in this direction has a higher likelihood of providing higher signal power. Usually, this least-loss direction would correspond to the side of the building where the GPS receiver is located, a window, or some other structural feature of the building that allows a lower loss path to the signals in a given direction.

The MPM may utilize a longest data capture mode of operation. The input sample buffer may be filled at a 2 bit, 2Fo sample rate to provide the maximum length of signal with a single operation of the RF GPS subsystem. Subsequently, the RF GPS subsystem is put in lowest power mode. The RF sample capture in the RF GPS subsystem is timed to begin during known data bits (such as telemetry data ("TLM") or predictable hand-over-word ("HOW") words), so that previously collected data for data bit stripping is not required. The differential propagation time from the GPS satellites expected to be visible is accounted for in this timing, based on the hypothesized position and current time uncertainty to ensure that the first arriving GPS signal is into the known bit regions before sampling begins.

Generally, a new set of data samples may be captured and processed every 60 seconds. Given a maximum sample buffer size of 100 k bytes, for example, and the sampling mode mentioned above, the RF GPS subsystem operation time may be limited to approximately 100 ms maximum. Any additional warm-up time for the TCXO before sampling may be arranged during power up using the KA FSM. The warm up time may be a maximum of approximately 2 seconds. Based on the operational experience of the system, control software within the system may set this value lower when possible.

After the data samples are captured and the RF GPS subsystem is turned off (or placed in the lowest power state), the captured data samples are processed for GPS satellites that are in view. The search is ordered based on strategies mentioned earlier. Generally, each GPS satellite is searched over a code phase and frequency range based on current position, time and frequency uncertainty estimates. Data bit stripping may be used with 100 ms coherent integration. The GPS satellites may be searched using a direct acquisition mode. In some cases, a threshold accession may occur on one or more GPS satellites. In these "easy cases," it may be possible to perform a complete navigation solution update. In the more difficult environments, the objective is to run the system as a timing receiver, where the system needs only one measurement. Further, this measurement may be a composite of multiple GPS satellite energy. The result of the measurement in this example is a code phase and a frequency. This code phase may be used to confirm that the position hypothesis is valid and to update the receiver time.

In the direct acquisition mode, the system may utilize, for example, a 100 ms coherent integration with data bit stripping. In this example, the following typical best case estimates may be made:
1) the TCXO with warm up provides repeatable ±20 PPB uncertainty relative to the last update with 60 second updates;
2) the RTC is calibrated to GPS or TCXO accuracy at each update;
3) the RTC elapsed time scaling provides ±14 chip uncertainty;
4) the indoor position uncertainty assumption is ±500 m;
5) the correlations are at ½ chip tap spacing and 5 Hz bin spacing for 1 dB average loss;

6) the hypotheses per GPS satellite is equal to 28 chips times 2 taps per chip times 65 Hz divided by 5 Hz per bin, which equals 728;
7) the mode utilizes 5 search channels;
8) at 60 seconds trial interval and 22.8 dB-Hz, pre-correlation results in 95% Pd per SV in 5 minutes; and
9) with at least 5 GPS satellites at 22.8 dB-Hz, there is at least one detection per 60 seconds expected on average.

In a cross satellite detection mode, when no single GPS satellite detection threshold is exceeded, multiple satellite processing is used. In this example, for each GPS satellite, this provides:
1) 5 search channels;
2) three frequency offsets per search channel;
3) 18 peaks per frequency offset;
4) where each peak is defined by a non-coherent sum ("NCS") amplitude, a code phase bin and a frequency bin;
5) per GPS satellite there are 5 times 3 times 18 for a total of 270 peaks; and
6) assuming 8 visible GPS satellites, the total peaks are 8 times 270 for a total of 2,160 peaks.

In the cross satellite detection mode, each GPS satellite has a set of peaks that sparsely covers the code and frequency space searched. The number of hypotheses in the best case of uncertainty is relatively small, so the number of peaks is a large fraction of the total number of hypotheses searched. However, this larger fraction is offset by the fact that the code phase and frequency spaces searched for each GPS satellite are not aligned at the same uncertainty space. Each GPS satellite has a center frequency and a center code phase that is different from those of the other GPS satellites. Therefore, before performing cross satellite combining, these uncertainty spaces are aligned so that their nominal centers are at the same value. One GPS satellite is selected as the base GPS satellite. The sets of peaks of the other GPS satellites are then adjusted so that the center bin (center code phase, center frequency) of each GPS satellite is aligned in code phase and frequency with the selected base GPS satellite's values. In this example, the process may have defined values as follows:
1) the code phase and frequency of the $k^{th}$ peak bin of GPS satellite "n" is defined as $B^n_k = (C^n_k, F^n_k)$, where B is a search bin defined as the code phase C and the frequency F that form the search coordinates of the bin;
2) for GPS satellite n, $C^n$ and $F^n$ are defined as the center values of its search range;
3) select GPS satellite 0 as the base GPS satellite, with center bin $C^0$, $F^0$;
4) the center bin code phase is the estimated GPS satellite range in chips modulo 1023 to nearest ½ chip;
5) the center bin frequency is the estimated GPS satellite line-of-sight ("LOS") Doppler plus estimated drift to nearest 5 Hz;
6) the bin coordinate adjustment for GPS satellite n is ($C^0-C^n$, $F^0-F^n$);
7) the bin coordinate adjustment for GPS satellite n bin k is $B^n_{adj\ k}$ which equals ($C^n_k$, $F^n_k$) plus ($C^0-C^n$, $F^0-F^n$), where $B^n_{adj\ k}$ which equals $B^n_k$ plus ($C^0-C^n$, $F^0-F^n$) that is the adjusted value of the $k^{th}$ bin of GPS satellites n;
8) where only a fraction of possible coordinates exist based on (Peaks/GPS Satellite) divided by (Hypotheses/GPS satellite); and
9) the peaks with like coordinates are combined.

In general, if the current estimates of position, frequency and time were perfect, the correlation peaks of all the GPS signals would show up in the center bin of each GPS satellite. By adjusting the coordinates during the MPM as described, the correlation peaks should line up closely. In this case, the time is accurate enough that the GPS satellite positions are accurate and the LOS effect of position error is only significant for GPS satellites at the lowest elevations. The time error will bias the code phases of each GPS satellite in the same direction (i.e., the range biases are all longer or all shorter), so that the bins with GPS signal are still closely aligned.

In this approach, peaks that are due to noise are less likely to find another peak from some other GPS satellite that has matching bin coordinates. Bins containing GPS signal energy are much more likely to find peaks from another GPS satellite with the same coordinates. Table 1 below indicates the likelihood of a GPS signal providing one of the peaks as a function of $C/N_o$.

TABLE 1

Probability of a Signal Peak versus C/No

| C/No (dB-Hz) Pre-Correlation Value before 1 dB Average Implementation Loss | Probability Correct Hypothesis is in Top 18 of 512 (3.5%) of Peaks for a Single GPS Satellite |
|---|---|
| 22.0 | 0.9957 |
| 21.5 | 0.9891 |
| 21.0 | 0.9782 |
| 20.5 | 0.9628 |
| 20.0 | 0.9373 |
| 19.5 | 0.9084 |
| 19.0 | 0.8706 |
| 18.5 | 0.8251 |
| 18.0 | 0.7774 |
| 17.5 | 0.7240 |
| 17.0 | 0.6623 |
| 16.5 | 0.6052 |
| 16.0 | 0.5492 |
| 15.5 | 0.4955 |
| 15.0 | 0.4493 |

In this approach, there may be a number of bins that find two or more peaks with the same bin coordinates. The threshold that should be applied to the sum for a particular bin coordinate point is a function of the number of terms (i.e., GPS satellites) in the non-coherent sum. Because the number of terms in the sum is more likely for the bin that is most nearly centered on the GPS signals, the bin with the largest number of terms is also most likely to have a sum that exceeds its threshold. Therefore the nominal procedure is to test the bin(s) with the largest number of terms. Where adjacent bins have higher numbers of terms, interpolation and processing with re-centering may provide a more accurate estimate of code phase and frequency for the combined GPS signals.

Figure 12A:
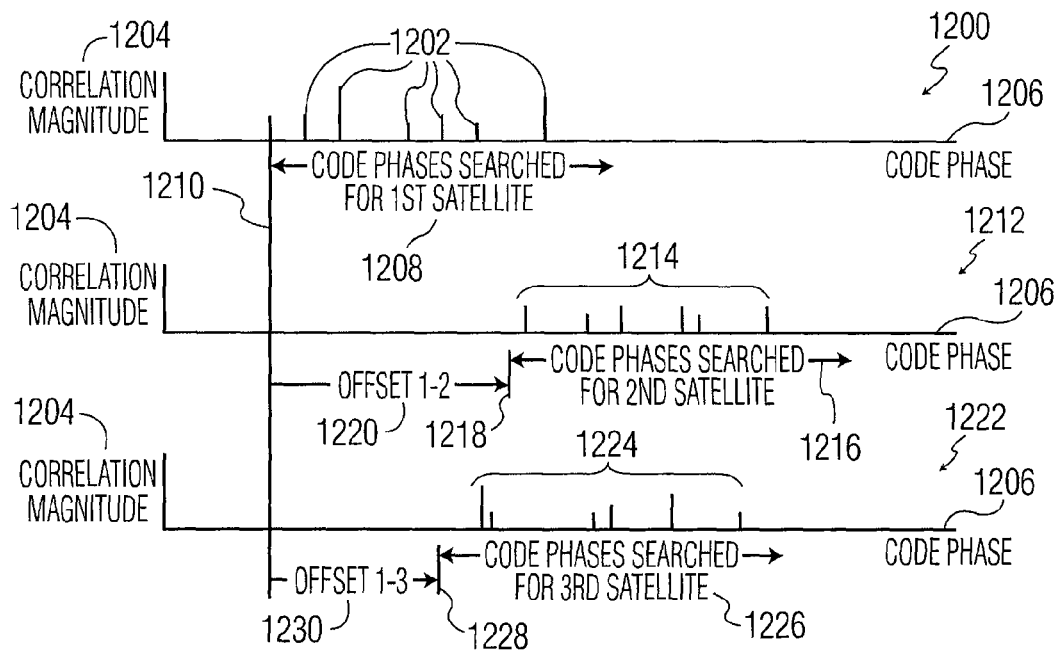
FIGS. 12A and 12B show plots of correlation magnitude versus code phase for a plurality of GPS satellites that illustrate examples of an implementation of a process for performing a cross satellite search.
Figure 12B:
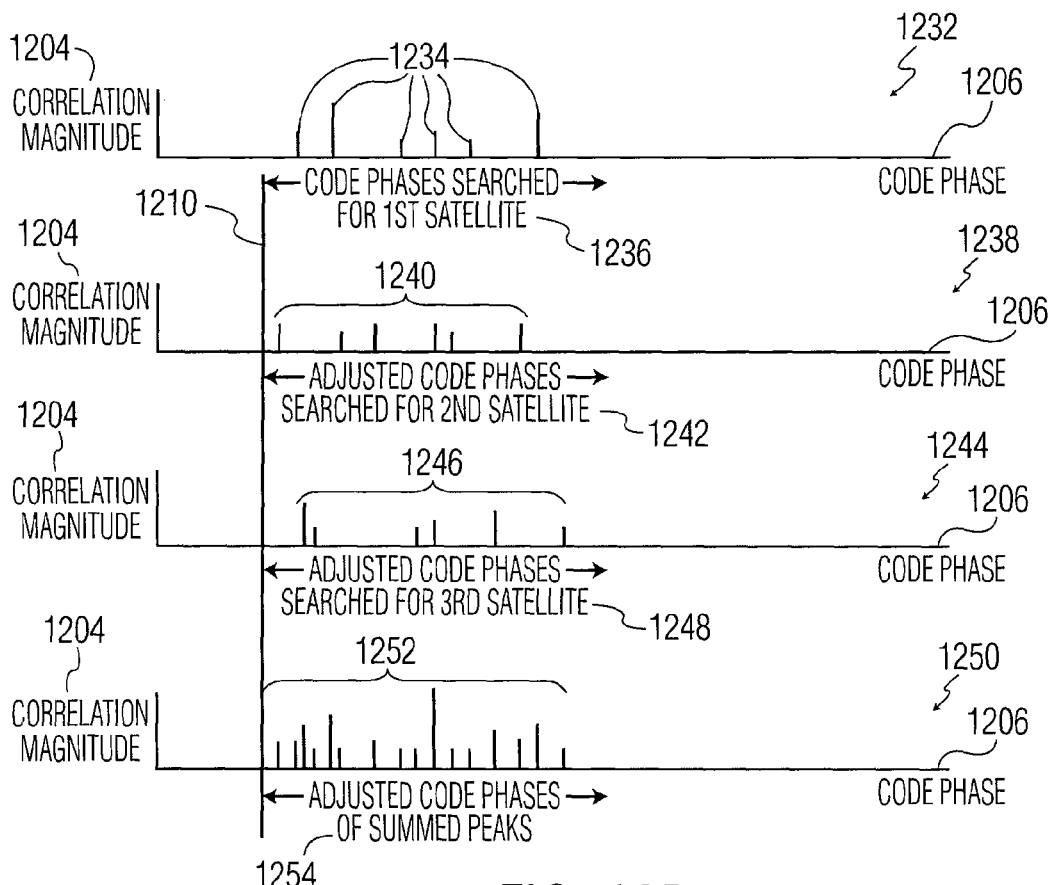

Turning to FIGS. 12A and 12B, in FIGS. 12A and 12B plots 1200, 1212, 1222, 1232, 1238, 1244, and 1250 of correlation magnitude versus code phase for a plurality of GPS satellites that illustrate examples of an implementation of a process are described for performing a cross satellite search. For example in plot 1200, the magnitudes of the largest correlation peaks of the received GPS signals 1202 that are saved in memory in the GPS section are shown as signals 1202 each having a correlation magnitude 1204 versus code phase 1206 for the first GPS satellite. In plot 1200, the code phases searched for the first GPS satellite 1208 is shown as spanning a first code phase distance starting at a first code phase reference value 1210. In plot 1212, the magnitudes of the largest correlation peaks of the received GPS signals 1214 that are saved in memory in the GPS section are shown as signals 1214 each having a correlation magnitude 1204 versus code phase 1206 for the second GPS satellite. In plot 1212, the code phases searched for the second GPS satellite 1216 are shown as spanning a second code phase distance starting at a second code phase reference value 1218. In this example, the offset 1220 from the first code phase reference to the second code phase reference, which corresponds to an offset between the first GPS and second GPS satellites is due to the difference in range between the GPS section and the first GPS and second GPS satellites. Similarly, in plot 1222 the magnitudes of the largest correlation peaks of the received GPS signals 1224 that are saved in memory in the GPS section are shown as signals 1224 each having a correlation magnitude 1204 versus code phase 1206 for the third GPS satellite. In plot 1222, the code phases searched for the third GPS satellite 1226 are shown as spanning a third code phase distance starting at a third code phase reference value 1228. In this example, the offset 1230 from the first code phase reference to the third code phase reference, which corresponds to an offset between the first GPS and third GPS satellites is due to the difference in range between the GPS section and the first GPS and third GPS satellites.

In plots 1232, 1238, and 1244 the code phase for the three example GPS satellites shown in plots 1200, 1212, and 1222 are shown after adjustment of code phase for range differences based on estimated time, frequency, and position have been made. Specifically, in plot 1232, the magnitudes of the largest correlation peaks of the received GPS signals 1234 that are saved in memory in the GPS section are shown as signals 1234 each having a correlation magnitude 1204 versus code phase 1206 for the first GPS satellite. In plot 1232, the code phases searched for the first GPS satellite 1236 is shown as spanning a fourth code phase distance starting at the first code phase reference value 1236. In plot 1238, the magnitudes of the largest correlation peaks of the received GPS signals 1240 that are saved in memory in the GPS section are shown as signals 1214 each having a correlation magnitude 1204 versus code phase 1206 for the second GPS satellite. In plot 1240, the code phases searched for the second GPS satellite 1242 are shown as spanning a fifth code phase distance starting at the first code phase reference value 1210. In this example, there is no offset such as the offsets shown in plots 1200, 1212, and 1222 because the process has adjusted the code phase for range differences based on estimated time, frequency and position. Similarly, plot 1244 the code phases searched for the third GPS satellite 1246 are shown as spanning a sixth code phase distance starting at the first code phase reference value 1210. Again, there is no offset such as the offsets shown in plots 1200, 1212, and 1222 because the process has adjusted the code phase for range differences based on estimated time, frequency and position. In plot 1250 the non-coherent sums 1252 of like code phases across GPS satellites after range adjustments of code phases are shown. In plot 1250 the code phases of the non-coherent sums 1252 are shown as spanning a seventh code phase distance 1254 starting at the first code phase reference value 1210 where the signal components of the GPS satellites, as shown in the non-coherent sums 1252, line up in the same adjusted bins as the signal components shown in 1234, 1240, and 1246.

Estimates have shown that the threshold of cross satellite processing may reduce the single GPS satellite threshold of 22.8 dB-Hz to below 17.6 dB-Hz for a 99.5% detection probability for a gain of 5.2 dB. As shown in Table 2, this approach indicates that at 16 dB-Hz, with a capture once per minute, the probability of success within 5 minutes is 98%.

TABLE 2

| Cross Satellite Combining Performance | |
|---|---|
| C/No (dB-Hz) for 8 GPS Satellites | Probability of Success (Max of combined bins exceeds threshold) |
| 18.0 | 0.9998 |
| 17.5 | 0.9947 |
| 17.0 | 0.9490 |
| 16.5 | 0.8017 |
| 16.0 | 0.5629 |
| 15.5 | 0.3298 |
| 15.0 | 0.1723 |

Operation of System Utilizing MPM

Turning back to FIG. 6, as an example of operation, the wireless device 600 includes the GPS section 604 to determine the location of the wireless device 600. This location information may be provided to a user of the wireless device 600, to an operator of the communications network, or to a third party through the communications network. This invention reduces the energy per fix, improves the TTFF, and reduces or eliminates the need for data aiding to provide continuous positioning with high probability at low power in weak signal or indoor environment of the wireless device 600. It accomplishes these goals by managing the time and frequency uncertainties to minimize the need for bit sync or frame sync. In a weak signal environment, data collection will often not be possible and GPS measurement for a position update not available. Therefore, the working assumption is that the user position is static and the GPS section 604 is put into a time maintenance mode. The system is turned on only to the extent necessary to keep the time uncertainty to within ±¼ of a coarse/acquisition ("C/A") code period.

The reason for assuming a static position is because a common situation occurs when the wireless device 600 enters a building where GPS signals are weak. The issue with the weak GPS signals is that the GPS section 604 may only be able to acquire and measure code phase on a few of them. In this example, the motion of the person is constrained by the building, which is typically less than a C/A chip length in space (i.e., about 300 m). In this situation, as long as the GPS section 604 can at least measure one GPS signal, the GPS section 604 is placed in a time maintenance mode where it may be implemented as a timing receiver assuming the GPS section 604 already knows the position from the last GPS solution before the entering the building. Since a timing receiver is only computing time, the GPS section 604 only needs to measure one GPS signal. Whenever the GPS section 604 can measure more than one GPS signal, the GPS section 604 can observe a common time bias and drift among these GPS signals and verify static position and zero velocity of the wireless device 600. Additionally, for some period of time, the GPS section 604 may update time just by using the TCXO (which is accurate to approximately 0.5 PPM) to calibrate the RTC (which generally varies over 200 PPM with temperature) and extend the length of time that the GPS section 604 can maintain accurate time. Thus, the GPS section 604 is maintaining GPS time in the RTC to quarter code period level and also verifying the position of the wireless device 600. The time bias correction of the RTC clock allows for accurate RTC clock frequency correction, which can also be translated back to the TCXO to estimate TCXO frequency in the event the TCXO has not yet been calibrated at the current temperature. Alternatively, or additionally, the common drift estimate of the GPS section update can be used to further calibrate the TCXO frequency at the current temperature.

As a result, if the GPS section 604 has position to a chip, time to 250 μsec and frequency to 50 PPB, the GPS section 604 can operate as a timing receiver with very low power. The system can turn on the RF/IF GPS subsystem 622 for just 100 ms to capture samples and store them. Then the GPS section 604 may process those samples to detect as many GPS signals as possible. Because the GPS section 604, in this example, knows time accurately, it can time the capture to correspond to one of the 30 bit words in each 6 second sub-frame that has known (or predictable) data.

Specifically, the HOW and TLM word have such data as such the GPS section 604 would only collect 5 bits (i.e., 100 ms) of samples within these known bit patterns. Because the GPS section 604 knows the data, the GPS section 604 can use the data to remove the 180 phase reversals of the 50 bit/sec data modulation. That allows the GPS section 604 to coherently integrate the samples for the full 100 ms, which provides better signal processing gain than could otherwise be achieved.

Because the GPS section 604 knows time so well, it performs the above described process without first having to use GPS signals to figure out where these bits were (i.e., bit sync) or what frame they were in because, in this example, the GPS section 604 already knew this. Therefore, as long as the GPS section 604 can maintain the accurate time, it can continue this time maintenance as long as it can find at least one GPS signal measurement every 5 minutes or so. In between these successful measurements, the GPS section 604 may use a temperature sensor and TCXO to keep the RTC based time accurate. Most of the time, the GPS section 604 is off except for the RTC and the temperature sensor/recorder, so it typically has very low current of about 10 μA.

Additionally, in this time maintenance mode, the GPS section 604 operates in a low power mode and wakes up occasionally to capture a relatively short sequence of RF sample data. A RTC (such as, for example, a low cost watch crystal running at 32,768 Hz) is used for maintaining time in the GPS section 604 between wake ups. Any data captured by the GPS section 604 while in the wake up state is synchronized to predictable data segments. Again, the GPS section 604 may operate as a timing receiver in a weak signal environment by assuming a static position of the GPS section and verifying this hypothesis whenever measurements can be taken. As stated above, this process utilizes TLM or predictable HOW words for data aiding because generally there are two short data sequences contained in the GPS data message that occur periodically and are predictable, which include a 30-bit TLM word and a 30-bit HOW word, where both 30-bit words have 22-bits of data and 8-bit sync preamble with a known bit patterns. When the GPS section 604 is in the time maintenance mode, the time accuracy of the GPS section 604 is maintained to be adequate to predict the location of these data words in the received GPS signal, however, even if the received weak GPS signal is so weak that the GPS section cannot demodulate the message bits, the GPS section will be able use the known data bits and their well estimated time locations in the received weak GPS signal to remove the phase inversion of the received weak GPS signal due to the data bits. As stated above, because the TLM and HOW bit sequences can be predicted, the GPS section 604 can remove phase transitions of the signal that had been created by the data modulation during the TLM and HOW sequences. This process is called "data stripping." After the phase transitions are removed, the GPS section 604 can coherently integrate the GPS signal for a duration much longer than a 20-ms data bit. The longer coherent integration enables the GPS section 604 to synchronize to the received time and frequency with proportionately weaker GPS signals. Thus, longer coherent integration using data stripping is utilized to enable GPS measurements at lower signal levels.

After the GPS data samples are captured, the RF front-end subsection of the GPS section 604 (i.e., the RF/IF GPS subsystem 622) is turned off to save power. The captured GPS samples are then processed by the baseband subsection of the GPS section 604 (i.e., baseband GPS subsystem 624) to recover the GPS signal measurements. As stated above, a goal for maintaining the time between GPS section 604 operations is to avoid bit synchronization such that power consumption may be minimized and detection sensitivity increased by performing longer coherent integration with data aiding.

A problem with maintaining time in the GPS section 604 between wake ups is that the frequency error of the RTC varies as a function of temperature where the frequency error is least sensitive to temperature variations when the ambient temperature is approximately 25° C., while being most sensitive to temperature variations at temperature extremes. As such, in order to maintain accurate time for a given rate of temperature change, the interval between GPS sampling utilized by the GPS section 604 may be adaptive where more frequent GPS sampling is performed by the GPS section 604 at temperature values that are extreme than at temperature values near 25° C. Alternatively, instead of using temperature values, the frequency of GPS sampling may be adapted based on the observed RTC clock frequency or the rate of change of the RTC clock frequency as compared to previous sampling. As another alternative, when the wireless device 600 operates on a cellular telephone network, the frequency of GPS sampling by the GPS section 604 may also be adapted based on the cellular Receive Signal Strength Indicator ("RSSI") measurements. In general, to minimize power consumption, these sampling rates should be kept as low as possible while keeping the time uncertainty to within ±¼ of a C/A code period.

The action to be taken after the captured samples are processed depends on the number of GPS measurements acquired. During some updates, there may not be any measurement acquired if the GPS signal level is too low. In these circumstances, the RTC time is updated based on the TCXO. This is done by calculating the ratio of TCXO to RTC frequencies. This can be accomplished by capturing a set of RTC and TCXO counter values at the start and at the end of the sample capture time. The differences of the counter values between the two capture times provide the ratio of the TCXO to RTC.

Assuming the TCXO frequency is the last value calibrated from the GPS signal, or the value of the TCXO frequency taken from a calibration model of frequency versus temperature evaluated at the current temperature, the change in RTC frequency since the previous update is then calculated using the RTC/TCXO ratio and the estimated TCXO frequency. In on of the simplest cases, the average between the current RTC frequency and the previous RTC frequency is used to scale the elapsed RTC time between updates. More precise corrections can be used based on knowledge of the shape of temperature change with time, such as linear or logarithmic characteristics. This scaled time delta is added to the current RTC time bias relative to GPS time to update the RTC time. This approach provides a good estimate of RTC time but it does not calibrate the TCXO for changes over temperature.

To calibrate the TCXO for changes over temperature, ratio of the RTC to TCXO may be utilized to construct a calibration table of TCXO frequencies versus the ratio of RTC/TCXO. Alternatively, a temperature sensor may be utilized to get temperature information that in combination with the GPS navigation solution estimate of TCXO drift may be utilized to calibrate the TCXO frequency error at that temperature. These calibration updates may be performed when the wireless device 600 is moving. They may also be performed in MPM under some conditions. The GPS section 604 may update the calibration table of an existing calibration point or calibrate an uncalibrated point. The GPS section 604 may also use an uncalibrated point at the current temperature that is close enough to other calibrated points so that an interpolation estimate of frequency may be calculated that is good enough to frequency aid the GPS section 604 to obtain a GPS measurement.

Another approach at calibrating the TCXO is by using the RTC as a temperature sensor because the RTC oscillators have a large change of frequency with temperature. As such, the ratio of RTC frequency to TCXO frequency gives GPS section 604 a measure of temperature. This can be used with a navigation solution value of TCXO frequency error to fill out a table of RTC/TCXO ratio versus TCXO frequency error. Then later, in MPM, the GPS section 604 may use the RTC/TCXO ratio to enter the table and extract the estimated TCXO frequency error. Since the RTC frequency is parabolic with maximum frequency near 25° C., calibrating the TCXO frequency versus RTC/TCXO frequency results in a TCXO calibration model that folds at the parabolic frequency peak at 25° C. While this results in TCXO frequency calibrations for temperature offsets an equal amount hotter or colder than 25° C. being represented at the same ratio (temperature), the model remains useful because the TCXO and RTC temperature characteristics are both flattest with least variation near 25° C. where most frequent operation occurs. At the temperature extremes of hot and cold, the variations are greater and the modeled uncertainty at these extremes will be larger due to this folding characteristic. In some cases, the system will have a coarse temperature sensor, such as in a battery system, that is not good enough for temperature calibration, but can be used to "unfold" the ambiguous temperature calibration about the 25° C. folding point by resolving the conditions when the ratio represents temperatures above 25° C. versus below 25° C. Both of these implementations provide performance improvements in the absence of a temperature sensor having adequately small temperature quantization for direct calibration versus the sensed temperature.

In this example, the GPS time uncertainty should be kept under ±¼ of a C/A code period to avoid bit sync ambiguity. If a GPS measurement cannot be obtained within the GPS uncertainty of ±¼ of a C/A code, then bit synchronization is performed when a GPS measurement becomes available at the cost of power consumption. Similarly, in order to avoid frame synchronization, the GPS time uncertainty should be kept within one data bit, or ±5 ms. Otherwise, data aiding would require multiple hypothesis testing which could be distributed among multiple updates to limit power consumption. In other words in MPM, if the GPS section 604 does not have good enough time to line up the 5 known data bits with the received GPS signal samples, the GPS section 604 may attempt different alignment hypotheses to determine if any of these hypotheses result in a GPS satellite detection.

When a single GPS measurement is acquired, then the RTC time and frequency and the TCXO frequency can be updated. The unexpected change in code phase from the measurement provides an accurate measure of the RTC change from the last GPS update. This change is used to correct the RTC time bias relative to GPS and also to update the RTC frequency. The corrections are made assuming that the change in code phase is less than ±¼ of a C/A code so that there is no bit sync ambiguity. As before, the RTC and TCXO counter values at the start and end of the sample capture time provide the ratio of the TCXO to RTC frequency. A standard ratio counter may be utilized in this example or preferable an edge aligned ratio counter ("EARC") may be utilized for greater accuracy over the same time interval. An example, of edge ratio counter is described in U.S. Pat. No. 6,788,655, titled "Personal Communications Device with Ratio Counter," issued Sep. 7, 2004 to P. Underbrink, which is herein incorporated by reference in its entirety. The updated RTC frequency is then used with the TCXO/RTC frequency ratio to update the TCXO frequency estimate. If the uncertainty in the GPS time or the observed RTC code phase measurement is not consistent with the underlying assumption of no bit sync ambiguity, then additional processing with shifted data bit aiding offsets are executed to resolve the ambiguity.

When multiple measurements are acquired, additional processing can be performed. Specifically, the static position hypothesis can be verified by ascertaining that the code phase correction for each satellite is consistent with a common time bias. The RTC time bias relative to GPS can then be corrected using the average of all the measured code phase changes. Similarly, the RTC frequency can be updated with the average of the frequency correction for all the satellites since the last GPS update. Additionally, if enough measurements with good geometry are available, a full position update can be attempted, particularly if there is bit sync ambiguity.

Alternatively, RTC can be calibrated using temperature sensing as the RTC crystal's frequency error is a function of temperature. The crystal is also normally optimized to be least sensitive to temperature change at approximately 25° C., while it changes very rapidly with temperature change at extreme temperatures. Therefore, the interval of the update time can be made adaptive based on the estimated temperature and the change of temperature since the last update. In general, if higher rates of temperature change are experienced, the interval between updates will be reduced. Conversely, smaller temperature changes allow longer update intervals. The frequency ratio between the RTC and the TCXO implies a temperature that can be exploited to detect a temperature change. A temperature change is also an indication of power consumption change in the overall system or environmental change, both of which are likely to change the RF environment and possibly lead to better GPS signal environment. For example, an indoor environment tends to be at approximately 25° C. and provides a smaller temperature change with the implication of weak GPS signal. Conversely, the most extreme temperatures tend to be experienced outdoors but these environments also present a higher probability for strong signal.

Data collection may also be initiated if GPS signal strength is strong enough and data is for a GPS satellite for which ephemeris is lacking. Because of power consideration, data collection is to be avoided as long as collected ephemeris or extended ephemeris remains valid for a GPS satellite or when a newly risen satellite can be used with biased almanac pseudo-range. Extended ephemeris is a orbital parameter set that has a target life time on the order of one week compared to the 4 hour life span of ephemeris data broadcast by the GPS satellite. A GPS section 604 could obtain extended ephemeris by downloading from a network (not shown) or by computing it itself based on ephemeris previously collected from a satellite. Alternatively, a rising GPS satellite can be calibrated by calculating a bias relative to the almanac orbital information. The almanac orbit information is less accurate than ephemeris orbital information. However, if the almanac is biased in range and range rate relative to a known position, this bias is valid for some hours of subsequent operation at a usable accuracy. These biased almanac GPS satellites can subsequently be used as measurement sources until an opportunity for ephemeris collection occurs.

This method provides robustness in the form of ability to adjust search uncertainty within the captured buffer. For example, dynamic adjustment of search window of time, frequency, and GPS satellite number can be made within the signal captured buffer and traded off against one another to meet power constraints. Search time can be extended to allow wider searches when uncertainties degrade or to search at lower sensitivity. As an example, if the GPS signal strength is low, then the interval the RF/IF GPS subsystem 622 is turned on is increased above the nominal 100 msec time. The intervals during which the RF/IF GPS subsystem 622 is turned on and digital samples are stored do not have to be continuous as long as the sub-intervals can be aligned with known GPS data bits to facilitate data stripping. Searches may also be controlled to remain within an energy constraint by ordering the GPS satellite search list and by distributing the search over multiple update times.

Even if no GPS measurement is acquired from the initial search, energy from multiple GPS satellites can be combined in a cross GPS satellite search to attempt a measurement. The objective is to obtain a single measurement so that the RTC time, frequency and the TCXO frequency can be updated as described previously. Each GPS satellite is searched over a range of code and frequency uncertainty space centered on a code phase and frequency. The center code phase for a satellite is the estimated satellite range in chips modulo-1023 to the nearest ½ chip and is different for each GPS satellite. Likewise, the center bin frequency for a GPS satellite is the estimated line-of-sight Doppler summed with the estimated clock drift to the nearest frequency bin and is different for each GPS satellite. Before performing cross GPS satellite combining, these uncertainty spaces are aligned so that their nominal centers are at the same value. Each GPS satellite has a set of peaks covering the code and frequency space searched. One GPS satellite is selected as the base GPS satellite. The sets of peaks of the other GPS satellites are then adjusted so that the center code phase and center frequency of each GPS satellite is aligned with the center code phase and center frequency of the selected base GPS satellite. In other words, the bin coordinate for each peak of each GPS satellite is differentially corrected so that the center bin for the GPS satellite is aligned with the center bin of the base GPS satellite. After differential correction of the peak coordinate, the magnitudes of peaks with like coordinates from all the GPS satellites are combined. If the current estimates of position, time, and frequency are perfect, the correlation peaks of all the GPS satellites would show up in the center bin of each GPS satellite. If the time is accurate enough such that the GPS satellite positions are accurate, any time error will bias the code phase of each GPS satellite in the same direction and the correlation peaks in code phase will still be closely aligned. Similarly, if the line-of-sight Doppler is accurate enough, any clock drift will bias the frequency bin of each GPS satellite in the same direction and the correlation peaks in frequency will also be closely aligned. The detection threshold applied to the non-coherent sum for a particular bin coordinate is a function of the number of terms (GPS satellites) in the non-coherent sum. The nominal procedure is to test the coordinate bins with the largest number of terms. Where adjacent bins have a higher total number of terms, interpolation and re-centering can also provide a more accurate estimate of the peak coordinate bin for the combined signals. Thus, cross GPS satellite non-coherent combining with differential correction can be used to lower the detect threshold for a single GPS measurement.

In this example, a drop in the values of the cellular RSSI measurements may be used to detect that a building has been entered. In this event, the GPS subsystems 622, 624, and 626 are immediately powered up so that a GPS fix can be taken. After the fix has been obtained, the GPS duty cycle is reduced. An increase in the values of the RSSI measurements then may be used to detect that the building has been exited. At that point, the GPS duty cycle would be increased. A drop in RSSI can also be used to trigger an almanac biasing of all visible satellites lacking valid ephemeris based on the last navigation solution prior to the RSSI dropping. This ensures the maximum number of usable satellite measurements while the system remains in the building.

It is appreciated by those skilled in the art that this invention is not limited to just cellular wireless devices. A GPS section could be embedded in a variety of handheld and portable devices that require low energy consumption. These devices include voice-over Internet protocol ("VoIP") handsets, satellite phone handsets, cordless telephone handsets, PDAs, and notebook computers. Also, this invention is not limited to communications devices that operate over cellular networks. Other networks, such as Wi-Fi®, WiMAX, mobile TV, or satellite could also be used.

Additionally, this invention is not limited to using RSSI measurements for selective power control. Other types of measurements could be used for the power control signal that is input into the power controller.

Figure 8:
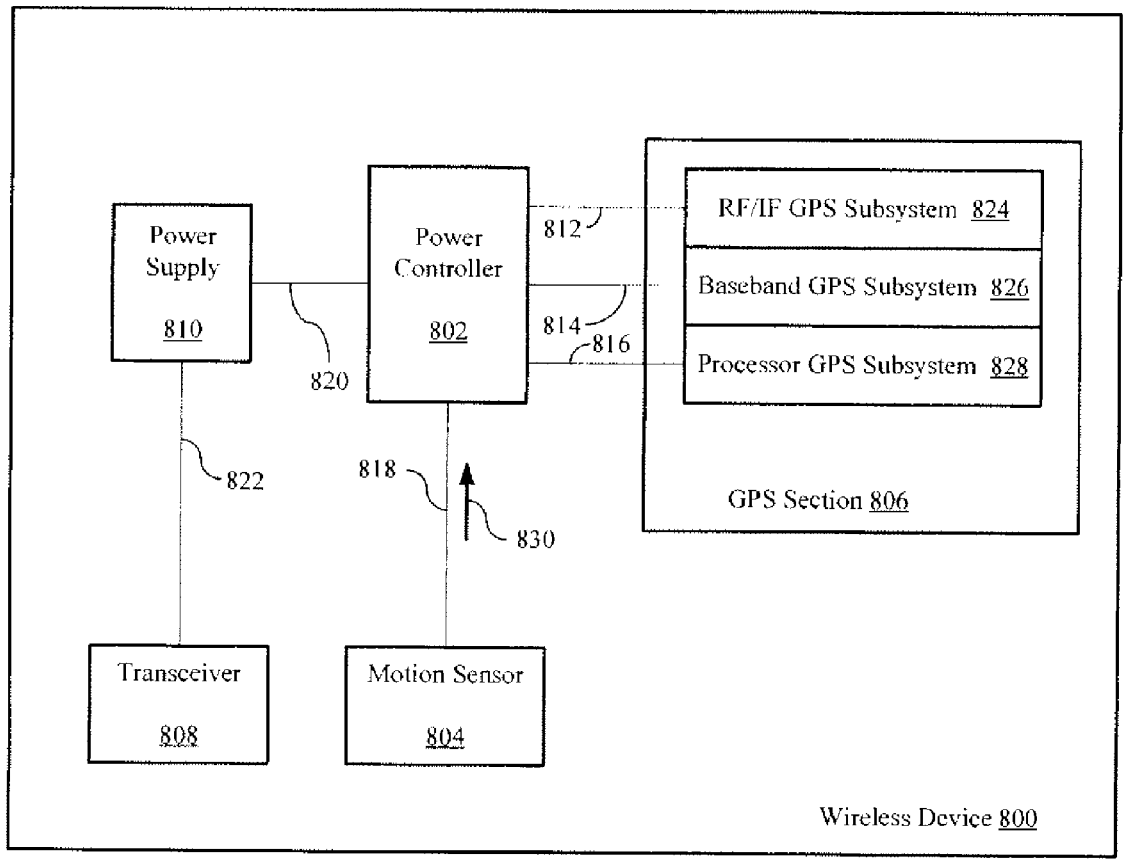
FIG. 8 shows a block diagram of an example of another implementation of a wireless device utilizing a power controller and a motion sensor to selectively power a GPS section in accordance with the invention.

In FIG. 8, a block diagram of an example of another implementation of the wireless device 800 utilizing a power controller 802 and a motion sensor 804 to selectively power a GPS section 806 is shown.

The wireless device 800 may include the power controller 802, motion sensor 804, GPS section 806, a transceiver 808, and a power supply 810. In this example, the power controller 802 may be in signal communication with GPS section 806, motion sensor 804, and power supply 810 via signal paths 812, 814, 816, 818, and 820, respectively. The transceiver 808 may be in signal communication with the power supply 810 via signal path 822. The GPS section 806 may include a plurality of GPS subsystems, which are a combined RF/IF GPS subsystem 824, a baseband GPS subsystem 826, and a processor GPS subsystem 828 which are in signal communication with the power controller 802 via signal paths 812, 814, and 816, respectively.

In an example of operation, the motion sensor 804 is used for selective power control, producing a power control signal 830 that is sent to the power controller 802 via signal path 818. When the motion sensor 804 sends a power control signal 830 that indicates that the wireless device 800 is stationary (for example, if the wireless device 800 is laying on a desk), the power controller 802 reduces the GPS section 806 duty cycle (i.e., the rate at which GPS samples are taken by the GPS section 806) to save power in the power supply 810. When the power control signal 830 sent by the motion sensor 804 indicates that the wireless device 800 is in motion, the power controller 802 increases the GPS section 806 duty cycle.

Figure 9:
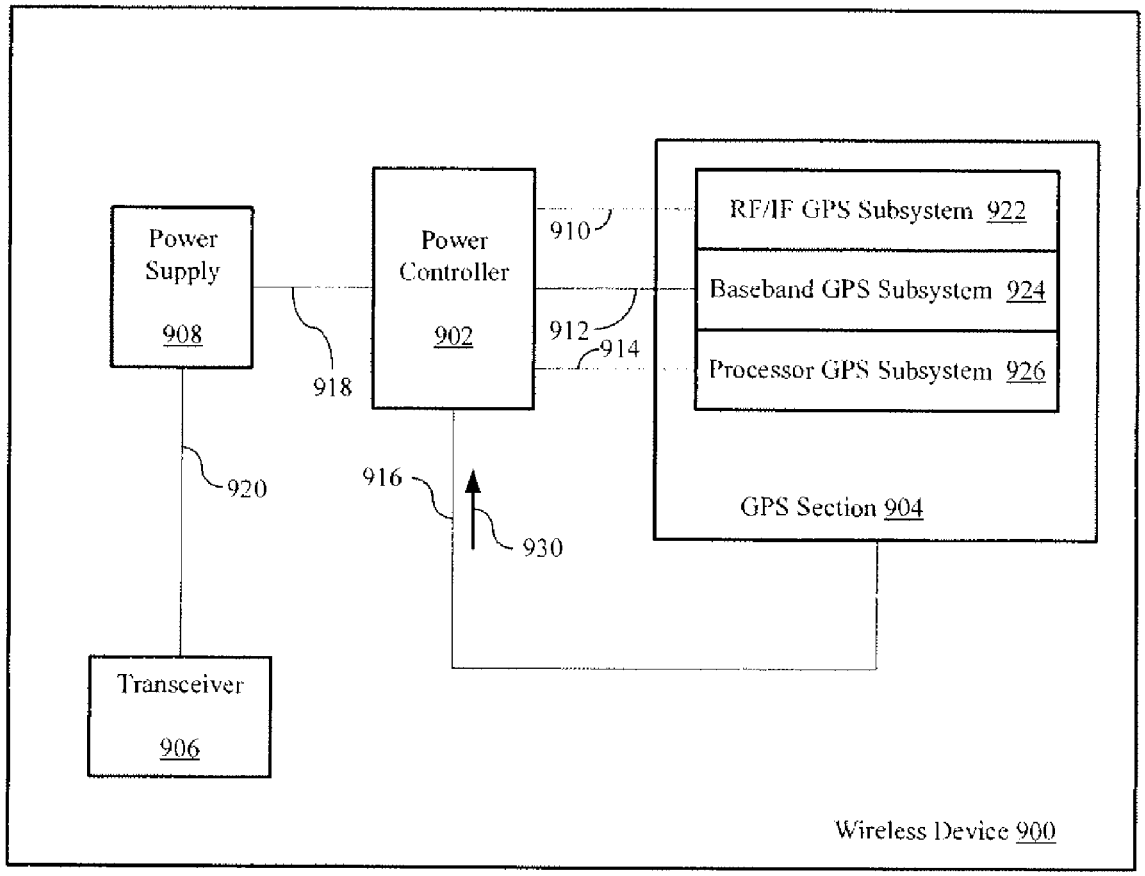
FIG. 9 shows a block diagram of an example of another implementation of the wireless device utilizing a power controller to selectively power a GPS section in accordance with the invention.

In FIG. 9, a block diagram of an example of another implementation of the wireless device 900 utilizing a power controller 902 to selectively power a GPS section 904 is shown. The wireless device 900 may include the power controller 902, GPS section 904, a transceiver 906, and a power supply 908. In this example, the power controller 902 may be in signal communication with the GPS section 904 and power supply 908 via signal paths 910, 912, 914, 916, and 918, respectively. The transceiver 906 may be in signal communication with the power supply 908 via signal path 920. The GPS section 904 may include a plurality of GPS subsystems, which are a combined RF/IF GPS subsystem 922, a baseband GPS subsystem 924, and a processor GPS subsystem 926, which are in signal communication with the power controller 902 via signal paths 910, 912, and 914, respectively.

As an example of operation, velocity measurements from the GPS section 904 are used to create a power control signal 930 that is sent from the GPS section 904 to the power controller 902 via signal path 916. The power control signal 930 is utilized by the power controller 902 for selective power control of the GPS section 904. Each time the GPS section 904 is powered up to take a fix, the change in position from the last fix is computed and divided by the time since the last fix to determine the average velocity.

Figure 10:
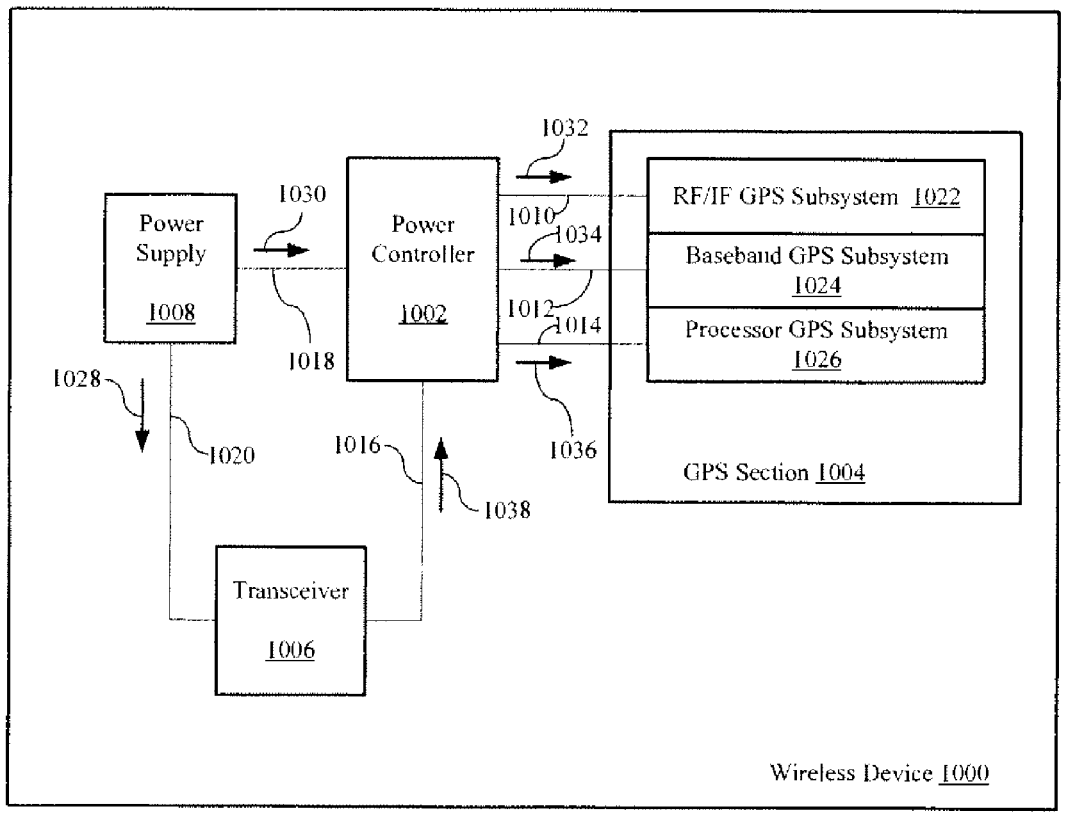
FIG. 10 shows a block diagram of an example of another implementation of the wireless device utilizing a power controller to selectively power a GPS section in accordance with the invention.

Turning to FIG. 10, a block diagram of an example of another implementation of a wireless device 1000 utilizing a power controller 1002 to selectively power a GPS section 1004 is shown. The wireless device 1000 may include the power controller 1002, GPS section 1004, a transceiver 1006, and a power supply 1008. In this example, the power controller 1002 may be in signal communication with GPS section 1004, transceiver 1006, and power supply 1008 via signal paths 1010, 1012, 1014, 1016, and 1018, respectively. The transceiver 1006 may be in signal communication with the power supply 1008 via signal path 1020. The GPS section 1004 may include a plurality of GPS subsystems that are a combined RF/IF GPS subsystem 1022, a baseband GPS subsystem 1024, and a processor GPS subsystem 1026, which are in signal communication with the power controller 1002 via signal paths 1010, 1012, and 1014, respectively.

Similar to the example in FIG. 6, in this example, the wireless device 1000 is a cellular wireless device where the transceiver 1006 is a cellular transceiver. The wireless device 1000 is configured such that each of the GPS section 1004 subsystems (RF/IF 1022, baseband 1024, and processor 1026) can be independently powered by the power controller 1002.

In operation, the power supply 1008 supplies a first power signal 1028 to the transceiver 1006 and a second power signal 1030 to the power controller 1002 via signal paths 1020 and 1018, respectively. The power controller 1002 selectively powers each of the GPS subsystems (via output signals 1032, 1034, and 1036) to perform GPS sampling and measurement based on a received power control signal 1038 from the transceiver 1006 (via signal path 1016), where the received power control signal 1038 includes information of the Doppler measurements made by the transceiver 1006. If the basestation Doppler shifts are small, the GPS section 1004 duty cycle is reduced. If they increase, the duty cycle is also increased.

In general, the various implementation examples of this invention utilize one or more of the following detection processes:

1) The RSSI samples are averaged for each signal over a time interval and differenced from those values computed over the previous interval. If the differences are less than a threshold, the device is considered to be stationary and the GPS duty cycle is maintained at a minimum value.
2) The RSSI samples are averaged for each signal over a time interval and differenced from those values computed over the previous interval. If the differences are less than a threshold then the GPS section is powered off.
3) The RSSI samples are averaged for each signal over a time interval and the variance computed over several time intervals. If the variances are greater than a threshold, then diversity is turned on.
4) The cellular signal Doppler is measured for each signal. If the maximum Doppler exceeds a threshold, then the GPS section is configured to operate with strong signal levels.
5) The RSSI samples are averaged for each signal over a time interval. If the averaged RSSI samples for a given percentage (for example, approximately 75%) of the signals drop by more than a threshold amount in a specified number of minutes then it is assumed that the wireless device has entered a building and an immediate position fix is taken, if possible, or the last position fix prior to entering the building is used as the building position.
6) The RSSI samples are averaged for each signal over a time interval. If the averaged RSSI samples for a given percentage (for example 75%) of the signals increase by more than a threshold amount in a specified number of minutes, then it is assumed that the device has exited a building and an immediate position fix is taken.
7) The RSSI samples are averaged for each signal over a time interval and the cellular signal Doppler is measured for each signal. If the RSSI samples are changing rapidly and the Doppler is low, then the device is assumed to be carried by a pedestrian and the GPS duty cycle is set accordingly low.

Figure 11A:
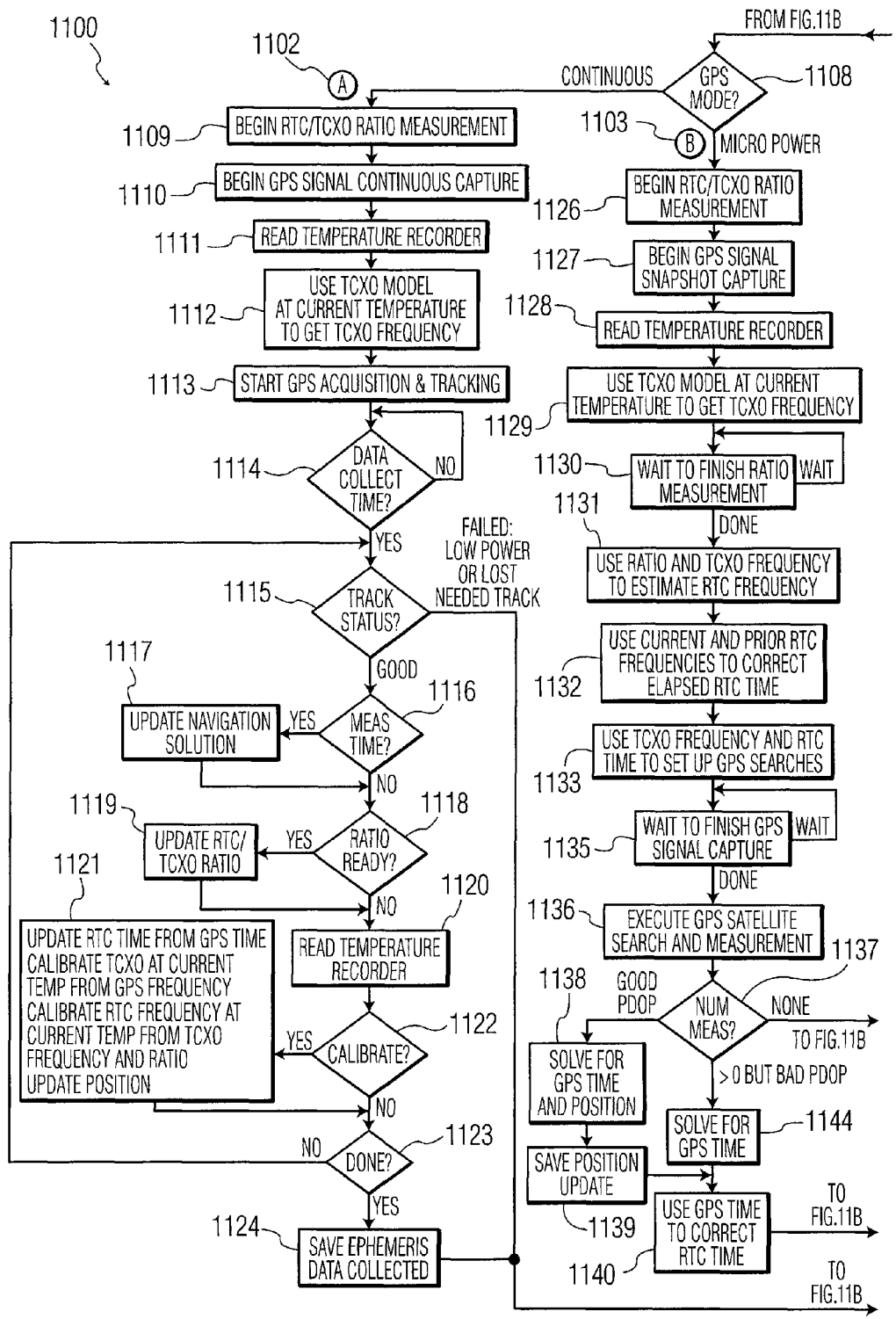
FIG. 11 shows a flowchart of an example of an implementation of a method preformed by the system in accordance with the invention.
Figure 11B:
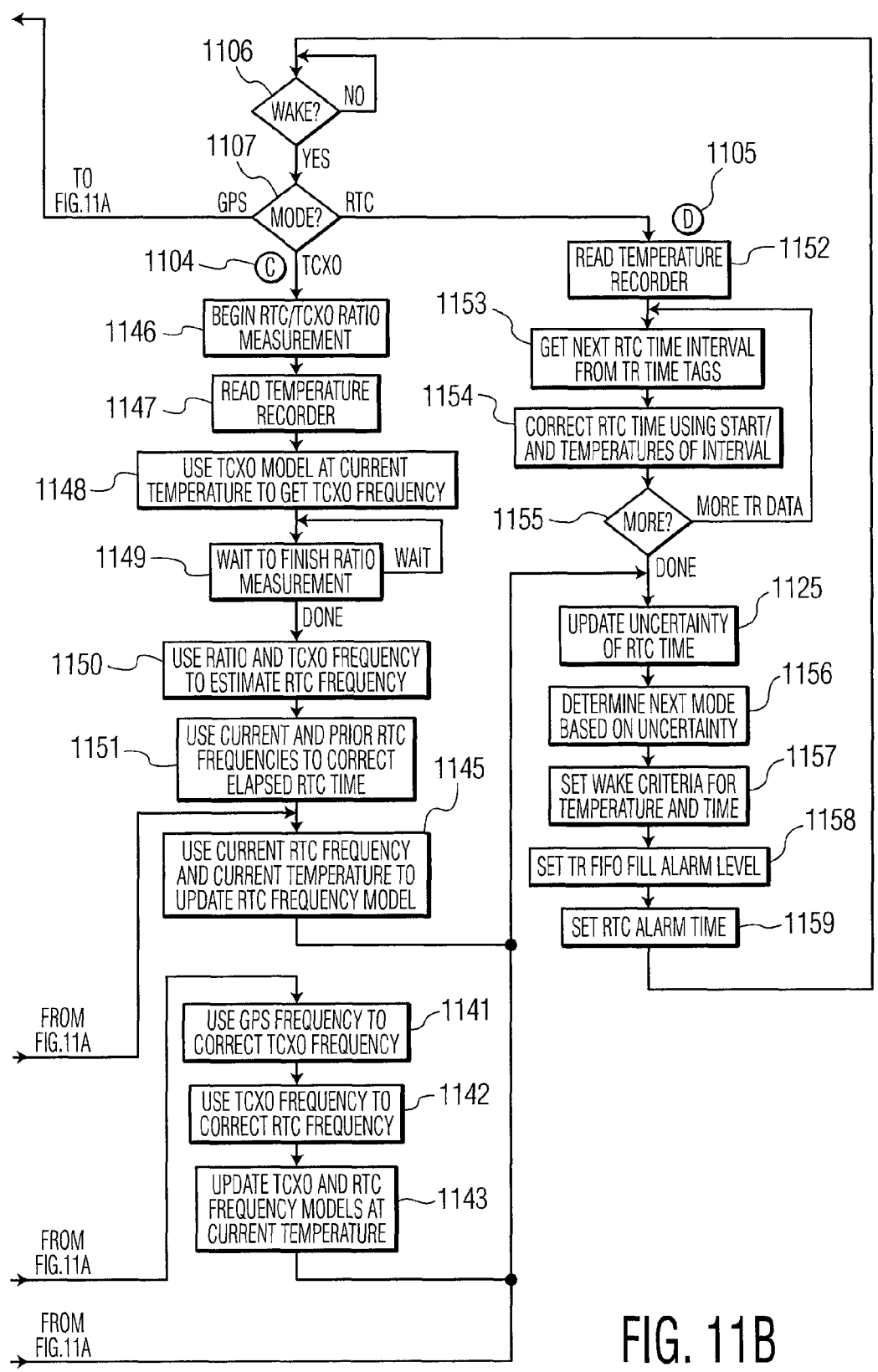

FIG. 11 is a flowchart 1100 of an example of an implementation of a method preformed by the system in accordance with the invention. The flowchart 1100 starts with a wake-up event and then describes four main kinds of wake-up processing that can occur in the MPM. The four kinds of wake-up processing are described by four processing paths labeled A 1102, B 1103, C 1104, and D 1105. In this example, each processing path has a different level of power consumption that depends on the power levels during these wake-up events and the different duty cycles associated with the frequencies that these different paths are executed at wake-up events.

The objective of this process is to always set up the next wake-up event to use the lowest power path with the longest possible off time until wake-up. The choice of which processing path to use depends on the GPS section's current estimate of uncertainty in position, time, frequency and ephemeris validity, where time uncertainty is generally the dominant variable.

Processing path A 1102 utilizes the highest power. This processing path is used when the GPS section is forced to collect ephemeris data from one or more GPS satellites. Typically, this occurs, at most, twice per hour with a wake-up time of slightly more than 18 seconds each time. The reason for the wake-up duration is that the ephemeris data from GPS satellites is transmitted in 3 sub-frames of 6 seconds each for a total time of 18 seconds. In some systems, this mode can be used as infrequently as every few hours when an extended ephemeris method is used.

When operating on path A 1102, the GPS section may also take the opportunity to perform other uncertainty reductions. This is possible because while collecting data from GPS satellites, the GPS section can also, at no significant additional cost in power, also update the current position and time from GPS measurements by executing the GPS navigation algorithm. In addition, based on the GPS solution, the GPS section can then update the TCXO frequency, RTC frequency and RTC time with highest accuracy.

It is appreciated that if the GPS section loses the ability to demodulate data for the GPS satellites for which it needs to collect ephemeris, it will abort the wake-up cycle rather than waste power uselessly. When aborting a data collection, those 30 bit words of the first three subframes that have been successfully collected with valid parity are retained, to allow a subsequent re-collection to proceed from the point of failure rather than a complete recollection. As such generally, processing path A 1102 is only attempted if the GPS section has first executed processing path B 1103 and found that it has sufficiently strong signals to collect data from those GPS satellites whose ephemeris data it needs with high urgency (i.e., the GPS section does not have current valid ephemeris or the data it currently has is about to expire and the GPS satellite will remain above the horizon for a sufficient amount of time to be useful to the GPS section).

Specifically in processing path A 1102, the GPS section performs the following process. The GPS section is placed in a wake-up state 1106 and the GPS section determines 1107 if it is in a GPS or RTC mode. If it is in a GPS mode, the GPS section determines 1108 if it will operate in either the MPM mode, via processing path B 1103, or the continuous mode via processing path A 1102. If the continuous mode is chosen the process continues to processing path A 1102 and the GPS section begins measurements to determine the RTC/TCXO ratio 1109. At the same time, or after, the GPS section begins continuously capturing GPS signals 1110 and reads information from a temperature recorder 1111 (if one is present). The GPS section then utilizes a TCXO model at the current temperature to get the TCXO frequency 1112. The GPS section then starts GPS acquisition and tracking process 1113 and then determines the data collect time 1114. The wake time had been programmed to allow some track time before the clock and ephemeris sub-frames 1-3 of the GPS frame is expected to begin. Data collection of the demodulated data bits from the various GPS satellites begins with the first required sub-frame, or 30 bit data word. Prior to this data collection time, the demodulated data bits are not required to be saved. The GPS section then determines 1115 the track status and it the track status remains locked with signal to noise above the threshold for low error rate demodulation, data demodulation and data bit collection continues. As data collection proceeds, the GPS section then determines if time 1116 has arrived for a periodic measurement pseudo-range and pseudo range rate of the tracked satellites, typically once per second. If the measurement time has arrived, measurements are collected and the GPS section then updates the navigation solution 1117 and the processes continues to determine 1118 if the RTC/TCXO ratio is ready. If the measurement time has not arrived the process continues directly to determine 1118 if the RTC/TCXO ratio is ready. If the RTC/TCXO ratio is ready, the GPS section updates the RTC/TCXO ratio and again reads the temperature recorder 1120 (if one is present). If the GPS section determines 1118 that the RTC/TCXO ratio is not ready, the process proceeds directly reading the temperature recorder 1120. The GPS section then determines 1122 whether any calibration needs to be preformed. If yes, the GPS sections may then update the RTC time from GPS time, calibrate the TCXO at the current temperature from the GPS frequency, calibrate the RTC frequency at the current temperature from the TCXO frequency using the RTC/TCXO ratio to relate the frequencies, and/or updates the positional information of the wireless device 1121. The GPS section then determines 1123 if any additional data collection, navigation updates or calibration processing needs to be performed. If so (not done), the process returns to step 1115 and repeats steps 1115 through 1123. If yes (done), the GPS section saves the ephemeris and data collected 1124 and proceeds to update the uncertainty of the RTC time 1125 in processing path D 1105. Additionally, if the GPS section determines 1115 that the track status failed because of low power or lost needed track, the process also continues to updating the uncertainty of the RTC time 1125 in processing path D 11105.

Turning to processing path B 1103, the system performs the MPM. The MPM operates at lower power (about 50 times lower) than the continuous mode described in processing path A 1102. In the MPM, the GPS section captures GPS RF samples for only a short time, on the order of 100 ms, rather than continuously for 18 seconds as in processing path A 1102. The GPS section then attempts to detect GSP signals in these samples and make range measurements to the GPS satellites detected. This mode may provide from 0 to several range measurements to the various GPS satellites currently above the horizon at the GPS section location. Under good conditions, there may be enough GPS satellites providing good geometry (e.g., so-called PDOP<10, where PDOP is the position dilution of precision) that the GPS navigation equations can be solved for position and time. This provides the highest quality opportunity to calibrate the TCXO and RTC frequencies at the current temperature, correct the RTC time to GPS accuracy and update the position of the GPS section. However, this MPM mode also addresses very difficult environments such as deep indoor locations, where there may be few, if any, GPS measurements possible. If at least one GPS signal measurement can be made, the GPS section can solve the GPS navigation equations by assuming that it is stationary (a good approximation when indoors) and update only GPS time. That is with one GPS signal measurement the GPS section can solve for one unknown, which is GPS time. If there are no GPS measurements possible, the GPS section may still take the opportunity to use the existing TCXO calibration table or model to correct RTC time in order to preserve low RTC time uncertainty as long as possible. While the MPM is low power, it is generally used sparingly because typically the wake-up interval is at least 60 seconds between the wake-up events which last generally about 200-300 ms.

Specifically in processing path B 1103, the GPS section performs the following process. The GPS section determines 1108 that it will operate in the MPM mode via processing path B 1103 and the GPS section begins measurements to determine the RTC/TCXO ratio 1126. At the same time, or after, the GPS section begins snapshot capturing GPS signals 1127 and reads information from a temperature recorder 1128 (if one is present). The GPS section then utilizes a TCXO model at the current temperature to get the TCXO frequency 1129 and waits until the ratio measurement is finished 1130. Once the ratio measurement is finished 1130, the GPS section utilizes the ratio and TCXO frequency to estimate the RTC frequency 1131 and then utilizes the current and prior RTC frequencies to correct the elapsed RTC time 1132. The GPS section then utilizes the TCXO frequency and RTC time to set up GPS searches 1133 and utilizes the TCXO frequency and then performs a GPS signal capture. The GPS section waits to finish the GPS signal capture 1135 and executes a GPS satellite search and measurement 1136. The GPS section then determines 1137 if there are enough GPS satellites measurements providing good geometry (i.e., PDOP). If there are, the GPS section solves for GPS time and position of the wireless device 1138 and then saves and updates the position information 1139. The GPS section then utilizes the GPS time to correct the RTC time 1140 and utilizes the GPS frequency to correct the TCXO frequency 1141. The GPS section also utilizes the TCXO frequency to correct the RTC frequency 1142 and update the TCXO and RTC frequency models at the current temperature 1143. The process then proceeds to step 1125 in processing path D 1105 where the GPS section updates the uncertainty of the RTC time.

If instead the GPS section determines 1137 that there more than zero but still not enough GPS satellites measurements to provide a good geometry, the GPS section solves for GPS time 1144 and then uses the GPS the GPS time to correct the RTC time 1140 and the process again proceeds to steps 1141 to 1125. Moreover, if the GPS section determines 1137 that no GPS satellites measurements are available, the process continues to step 1145 in processing path C 1104 where the GPS section uses the current RTC frequency and current temperature to update the RTC frequency model and the processes then proceeds to step 1125 in processing path D 1105 where the GPS section updates the uncertainty of the RTC time 1125.

Turning to processing path C 1104, the system determines that only the TCXO update of the RTC is needed. In this mode, the GPS section utilizes less power than in the MPM mode described in processing path B 1103. In this case, the TCXO frequency versus temperature calibration table is used to calibrate the RTC frequency via a circuit that measures the ratio between RTC and TCXO frequency using either the conventional ratio counter or the EARC. Given this RTC frequency estimate and the prior RTC frequency estimate from the previous wake-up event, the GPS section can scale the elapsed RTC time to correct its current value relative to GPS system time. In this mode, the GPS section only needs to run the TCXO, the RTC, the ratio measurement circuits and the system micro processor. Further, the processor in the GPS section only operates at a very low duty cycle during the wake-up event. Typically the wake-up event in this case is a change in the temperature sensed by the temperature recorder. Often this will be a single recorded temperature with a change of just one LSB of the sensor A/D. If temperature is stable, the wake-up events may be spaced quite far apart in time, while if temperature is changing rapidly, they may occur as often as once per second.

Specifically in processing path C 1104, the GPS section performs the following process. The GPS section determines 1107 that it will operate in the TCXO mode of RTC update via processing path C 1104 and the GPS section begins measurements to determine the RTC/TCXO ratio 1146. Then the GPS section reads information from a temperature recorder 1147, utilizes a TCXO model at the current temperature to get the TCXO frequency 1148, and waits until the ratio measurement is finished 1149. Once the ratio measurement is finished 1149, the GPS section utilizes the ratio and TCXO frequency to estimate the RTC frequency 1150 and then utilizes the current and prior RTC frequencies to correct the elapsed RTC time 1151. The GPS section then utilizes the current RTC frequency and current temperature to update the RTC frequency model 1145 and the process proceeds to step 1125 in processing path D 1105 where the GPS section updates the uncertainty of the RTC time 1125.

Turning to processing path D 1105, the system determines that it is in a trickle-power mode that only updates the RTC. In this mode, the GPS takes full advantage of the ability of the GPS section to record RTC counter time tagged temperatures over an extended time, typically several minutes. In order to use this mode, the GPS section calibrates the RTC oscillator frequency versus temperature. Then, when the wake-up event occurs, usually due to the first-in-first-out ("FIFO") state machine in the temperature recorder ("TR") having reached a programmed fill point, the number of measurements spans some number of time segments between sequential wake events. For each RTC time segment defined by adjacent time tagged temperatures, the GPS section can estimate the accumulated error in the RTC time due to the temperature change by using the RTC frequency versus temperature calibration table. Thus, segment by segment, the GPS sections corrects the current RTC time. This process allows very infrequent wake intervals that still allow correcting the elapsed RTC time as a batch of corrections. In this case, the GPS section does not need to turn on the TCXO or ratio counter. Only the GPS processor in the GPS section needs to run and the corrections can be calculated in some few hundred micro seconds at very low expended average power.

Specifically in processing path D 1105, the GPS section performs the following process. The GPS section reads information from a TR 1152, obtains the next RTC time interval from the TR time tags 1153, and corrects the RTC time using the start and end temperatures of the interval 1154. The GPS section then determines 1155 if more TR data is available in the TR FIFO. If more is available, the process repeats process steps 1152 through 1155. If no additional data is available, the GPS section updates the uncertainty of the RTC time 1125, determines the next mode of operation based on the uncertainty 1156, and sets wake-up criteria for the temperature and time 1157. The GPS section then sets the TR FIFO fill alarm level for the TR temperature based wake-up event 1158 and sets the RTC alarm time for the RTC timed wake-up event 1159. Both events are used to ensure that even in the case where temperature is constant, the RTC alarm will periodically wake the system to evaluate the current system conditions. The GPS section then returns to the wake-up determination step 1106 to wait the next wake event and the process repeats.

While various embodiments of the invention have been described, it will be apparent to those of ordinary skill in the art that many more embodiments and implementations are possible within the scope of this invention. Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention. Accordingly, the invention is not to be restricted except in light of the attached claims and their equivalents.

What is claimed is:

1. A wireless device including a transceiver that utilizes a power supply, the wireless device comprising:
   a Global Positioning System ("GPS") section having a plurality of GPS subsystems; and
   a power controller in signal communication with the power supply and GPS section, wherein the power controller is configured to selectively power each GPS subsystem from the plurality of GPS subsystems in response to receiving an input power control signal and in accordance with monitored GPS signal conditions at the wireless device,
   wherein the GPS section is configured to operate as a timing receiver when the wireless device is in a weak signal environment, and wherein the GPS section is configured to assume that the wireless device is in a static position and to verify that assumption that the wireless device is in a static position whenever the GPS section is capable of performing measurements in the weak signal environment.

2. The wireless device of claim 1, wherein the plurality of GPS subsystems includes
   at least one RF GPS subsystem,
   a baseband GPS subsystem, and
   a processor GPS subsystem and wherein the power controller is configured to turn off the at least one RF GPS subsystem in response to receiving the input power control signal.

3. The wireless device of claim 2, wherein the input power control signal is produced by a component selected from the group consisting of the GPS section, a transceiver, a temperature sensor, and a motion sensor.

4. The wireless device of claim 3, wherein the input power control signal is produced by the transceiver and the input power control signal is an RSSI measurement signal or a Doppler measurement signal.

5. The wireless device of claim 3, wherein the input power control signal is produced by the GPS section and includes velocity measurements from the GPS section.

6. The wireless device of claim 3, wherein the GPS section is configured to manage time and frequency uncertainties so as to minimize the need for bit synchronization, frame synchronization, or both.

7. The wireless device of claim 6, wherein the GPS section is configured to operate in a low-power mode that wakes up only to the extent necessary to keep the time uncertainty to within ±¼ of a coarse/acquisition ("C/A") code period.

8. The wireless device of claim 3, wherein the GPS section is capable of operating in a low-power mode that wakes up occasionally to capture a relatively short sequence of RF sample data.

9. The wireless device of claim 8, wherein the GPS sampling is capable of being adapted based on cellular RSSI measurements.

10. The wireless device of claim 8, further including a real-time clock ("RTC").

11. The wireless device of claim 10, wherein the RTC is configured to run at 32,768 Hz.

12. The wireless device of claim 10, wherein the GPS section is configured to capture data that is synchronized to predictable data segments.

13. The wireless device of claim 12, wherein the predictable data segments are data bits from synchronized bit segments of telemetry data ("TLM") or predictable time of the week ("TOW") bit segments of hand-over-word ("HOW") words of data.

14. The wireless device of claim 3, further including a real-time clock ("RTC") that has a frequency error as a function of temperature.

15. The wireless device of claim 14, wherein the GPS section is configured to receive GPS samples that have a GPS sampling interval frequency that is adaptive.

16. The wireless device of claim 15, wherein the GPS sampling interval frequency is adaptive based on an observed clock frequency of the RTC.

17. The wireless device of claim 16, wherein GPS sampling interval frequency is adapted based on a rate of change of an observed RTC clock frequency based on a previous observed RTC clock frequency sample.

18. The wireless device of claim 3, wherein the power controller is further configured to receive an input power control signal from the motion sensor and wherein the GPS sampling has a duty cycle that is reduced whenever the wireless device is stationary.

19. The wireless device of claim 3, wherein RSSI measurements are utilized to determine that the wireless device is stationary.

20. The wireless device of claim 19, wherein Doppler shift measurements are utilized to determine that the wireless device is stationary.

21. The wireless device of claim 19, wherein the duty cycle is reduced when the wireless device is moving slower than a predetermined threshold.

22. The wireless device of claim 21, wherein predetermined threshold is 10 miles per hour.

23. The wireless device of claim 3, wherein the wireless device includes a transceiver type chosen from a group consisting of a cellular transceiver, Wi-Fi transceiver, Wi-Max transceiver, and satellite transceiver.

24. The wireless device of claim 1, wherein the wireless device is a type of wireless device chosen from a group consisting of is a notebook computer, cordless telephone handset, satellite telephone handset, voice-over Internet protocol ("VoIP") handset, and cellular handset.

25. The wireless device of claim 10, wherein the RTC has a time value and frequency value and wherein the GPS section is configured to update the time and frequency values based on a signal from a Temperature Controlled Crystal Oscillator ("TCXO") that has a TCXO frequency when no GPS signal measurement is possible.

26. The wireless device of claim 25, wherein the RTC frequency is updated based on a ratio of the RTC to TCXO, where the TCXO frequency is the last value calibrated from GPS measurement.

27. The wireless device of claim 26, wherein the current RTC time bias relative to GPS time is updated based on an average between the current RTC frequency and the previous RTC frequency update.

28. The wireless device of claim 26, wherein the GPS section is configured to calibrate the TCXO utilizing a folded calibration of the ratio of the RTC to TCXO versus a TCXO frequency error.

29. The wireless device of claim 28, wherein the folded calibration utilizes a conventional ratio counter or an edge aligned ratio counter.

30. The wireless device of claim 28, wherein the RTC has a frequency error as a function of temperature and the GPS section is configured to calibrate the RTC frequency error based on temperature measurements produced by the temperature sensor.

31. The wireless device of claim 28, wherein the GPS section is configured to adaptively change the interval of the update time based on the estimated temperature and the change of temperature.

32. The wireless device of claim 30, wherein the TCXO frequency error versus temperature is calibrated based on temperature data produced by the temperature sensor.

33. A wireless device including a transceiver that utilizes a power supply, the wireless device comprising:
  a Global Positioning System ("GPS") section having a plurality of GPS subsystems; and
  a power controller in signal communication with the power supply and GPS section, wherein the power controller is configured to selectively power each GPS subsystem from the plurality of GPS subsystems in response to receiving an input power control signal and in accordance with monitored GPS signal conditions at the wireless device,
  wherein the GPS section includes a capture buffer containing collected satellite data over a plurality of data bits, and wherein the GPS section is further configured to dynamically adjust satellite search uncertainty for processing the data in the capture buffer based on the monitored GPS signal conditions.

34. The wireless device of claim 33, where use of cross satellite non-coherent combining with different range correction is utilized to reduce the detection threshold in a timing receiver mode.

35. The wireless device of claim 8, wherein the GPS section is configured to avoid performing data collection when the GPS section is capable of calibrating a new GPS satellite utilizing a range and drift for the new GPS satellite based on almanac and a current time and a position hypothesis.

36. A power controller utilized in a wireless device having a Global Positioning System ("GPS") section having a plurality of GPS subsystems, the power controller comprising:
　a first input capable of receiving an input power signal from a power source within the wireless device;
　a second input capable of receiving an input power control signal;
　a plurality of outputs, wherein each output from the plurality of outputs is capable of being in signal communication with a corresponding GPS subsystem from the plurality of GPS subsystems; and
　a controller capable of both selecting each output from the plurality of outputs and sending a power signal from the selected output to the corresponding GPS subsystem in accordance with monitored GPS signal conditions at the wireless device,
　wherein the GPS section is configured to operate as a timing receiver when the wireless device is in a weak signal environment, and wherein the GPS section is configured to assume that the wireless device is in a static position and to verify that assumption that the wireless device is in a static position whenever the GPS section is capable of performing measurements in the weak signal environment.

37. The power controller of claim 36, wherein the plurality of GPS subsystems includes
　at least one RF GPS subsystem,
　a baseband GPS subsystem, and
　a processor GPS subsystem and
　wherein the power controller is configured to turn off the at least one RF GPS subsystem in response to receiving the input power control signal.

38. The power controller of claim 37, wherein the input power control signal is produced by a component selected from the group consisting of the GPS section, a transceiver, a temperature sensor, and a motion sensor.

39. The power controller of claim 38, wherein the input power control signal is produced by the transceiver and the input power control signal is an RSSI measurement signal or a Doppler measurement signal.

40. The power controller of claim 38, wherein the input power control signal is produced by the GPS section and includes velocity measurements from the GPS section.

41. A method for operating a Global Positioning System ("GPS") section, within a wireless device, in a micro-power mode ("MPM"), where the GPS section has a plurality of GPS subsystems, the method comprising:
　receiving an input power control signal;
　selectively powering each GPS subsystem within the plurality of GPS subsystems in response to receiving the input power control signal based on a set of rules and in accordance with monitored GPS signal conditions at the wireless device; and
　operating the GPS section as a timing receiver when the wireless device is in a weak signal environment, wherein operating as a timing receiver includes
　assuming that the wireless device is in a static position and
　verifying the assumption that the wireless device is in a static position whenever the GPS section is capable of performing measurements in the weak signal environment.

42. The method of claim 41, wherein the input power control signal is produced by a component selected from the group consisting of the GPS section, a transceiver, a temperature sensor, and a motion sensor.

43. The method of claim 42, wherein the input power control signal is produced by the transceiver and the input power control signal is an RSSI measurement signal or a Doppler measurement signal.

44. The method of claim 42, wherein the input power control signal is produced by the GPS section and includes velocity measurements from the GPS section.

45. The method of claim 42, further including managing time and frequency uncertainties so as to minimize the need for bit synchronization, frame synchronization, or both.

46. The method of claim 45, further including operating in a low-power mode that wakes up only to the extent necessary to keep the time uncertainty to within ±¼ of a coarse/acquisition ("C/A") code period.

47. The method of claim 46, further including operating in a low-power mode that wakes up occasionally to capture a relatively short sequence of RF sample data.

48. The method of claim 47, further including GPS sampling adaptively based on cellular RSSI measurements.

49. The method of claim 43, further including capturing data that is synchronized to predictable data segments.

50. The method of claim 49, further including utilizing longer coherent integration that utilizes data stripping to enable measurements of GPS signal data at lower signal levels.

* * * * *

UNITED STATES PATENT AND TRADEMARK OFFICE
CERTIFICATE OF CORRECTION

PATENT NO. : 8,188,917 B2  
APPLICATION NO. : 12/414612  
DATED : May 29, 2012  
INVENTOR(S) : Gronemeyer et al.

Page 1 of 1

It is certified that error appears in the above-identified patent and that said Letters Patent is hereby corrected as shown below:

In Column 1, Line 25, delete "Bluetooth*)" and insert -- Bluetooth® --, therefor.

In Column 18, Line 55, delete "on of the" and insert -- one of the --, therefor.

In Column 26, Line 3, delete "D 11105." and insert -- D 1105. --, therefor.

Signed and Sealed this  
Fifth Day of February, 2013

Teresa Stanek Rea  
*Acting Director of the United States Patent and Trademark Office*